United States Patent
Gutierrez et al.

(10) Patent No.: US 12,095,782 B2
(45) Date of Patent: Sep. 17, 2024

(54) INFERENCE MODELS FOR INTRUSION DETECTION SYSTEMS IN TIME SENSITIVE NETWORKS

(71) Applicant: Intel Corporation, Santa Clara, CA (US)

(72) Inventors: Christopher Gutierrez, Hillsboro, OR (US); Vuk Lesi, Cornelius, OR (US); Manoj Sastry, Portland, OR (US); Christopher Hall, Portland, OR (US); Marcio Juliato, Portland, OR (US); Shabbir Ahmed, Beaverton, OR (US); Qian Wang, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 352 days.

(21) Appl. No.: 17/706,955

(22) Filed: Mar. 29, 2022

(65) Prior Publication Data

US 2022/0224701 A1    Jul. 14, 2022

(51) Int. Cl.
*H04L 9/40* (2022.01)
*H04J 3/06* (2006.01)

(52) U.S. Cl.
CPC ........ *H04L 63/1416* (2013.01); *H04J 3/0667* (2013.01); *H04L 63/145* (2013.01); *H04L 63/1475* (2013.01)

(58) Field of Classification Search
CPC ... H04L 63/1416; H04J 3/0667; H04J 3/0673; H04J 3/0685
USPC ........... 709/220, 224, 225, 227, 228; 726/23
See application file for complete search history.

(56) References Cited

U.S. PATENT DOCUMENTS

| | | | | |
|---|---|---|---|---|
| 8,064,485 B1* | 11/2011 | Montini | ................ | H04L 43/106 398/154 |
| 8,416,763 B1* | 4/2013 | Montini | .............. | H04L 43/0858 370/350 |
| 10,666,536 B1* | 5/2020 | Gilbert | .................... | H04L 63/20 |
| 2013/0227008 A1* | 8/2013 | Yang | ..................... | H04J 3/0667 709/204 |
| 2018/0131102 A1* | 5/2018 | Wang | ........................ | H01Q 3/38 |
| 2019/0379668 A1* | 12/2019 | Baran | .................... | H04L 63/166 |
| 2020/0127924 A1* | 4/2020 | Bugenhagen | ......... | H04L 43/022 |

(Continued)

FOREIGN PATENT DOCUMENTS

| | | | |
|---|---|---|---|
| CA | 2999694 A1 * | 10/2018 | ............. G06F 13/36 |
| CN | 110458038 A * | 11/2019 | ......... G06K 9/00335 |

*Primary Examiner* — Khanh Q Dinh
(74) *Attorney, Agent, or Firm* — KDW Firm PLLC

(57) ABSTRACT

Techniques to secure a time sensitive network are described. An apparatus may establish a data stream between a first device and a second device in a network domain, the network domain includes a plurality of switching nodes, receive messages from the first device by the second device in the network domain, the messages to comprise time information to synchronize a first clock for the first device and a second clock for the second device to a network time for the network domain, update a correction field for a received message with a residence time and time delay value by the second device, determine whether the updated message is benign or malicious, update the correction field for the updated message with an inference time when the updated message is benign, and prevent relay of the updated message to other devices in the network domain when the updated message is malicious.

24 Claims, 17 Drawing Sheets

(56) References Cited

U.S. PATENT DOCUMENTS

| | | | |
|---|---|---|---|
| 2020/0274870 A1* | 8/2020 | Zinar | H04L 63/0236 |
| 2022/0224501 A1* | 7/2022 | Lesi | H04J 3/0673 |
| 2022/0224701 A1* | 7/2022 | Gutierrez | H04L 63/145 |

* cited by examiner

ABSTRACT# INFERENCE MODELS FOR INTRUSION DETECTION SYSTEMS IN TIME SENSITIVE NETWORKS

BACKGROUND

Many computing systems require real-time safety critical features. For example, many autonomous systems, industrial systems, etc., require such systems to have real-time safety-critical features. This often necessitates that time performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles requires synchronization of sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-sensitive networking (TSN).

In general, TSN defines a set of standards (and amendments) with the aim to enable time synchronization and deterministic data delivery in converged networks where time-critical (TC) traffic coexists with other types of traffic. Thus, there is a need to provide security for TSN devices to mitigate the risks associated with disruption in TSN operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A illustrates a network 100a.
FIG. 2A illustrates a network 200a.
FIG. 4A illustrates a system 400a.
FIG. 5A illustrates a system 500a.
FIG. 6A illustrates a network 600a.
FIG. 7A illustrates a network 700a.
FIG. 10A illustrates a device 1000a.
FIG. 10B illustrates a device 1000b.

DETAILED DESCRIPTION

Figure 1A:
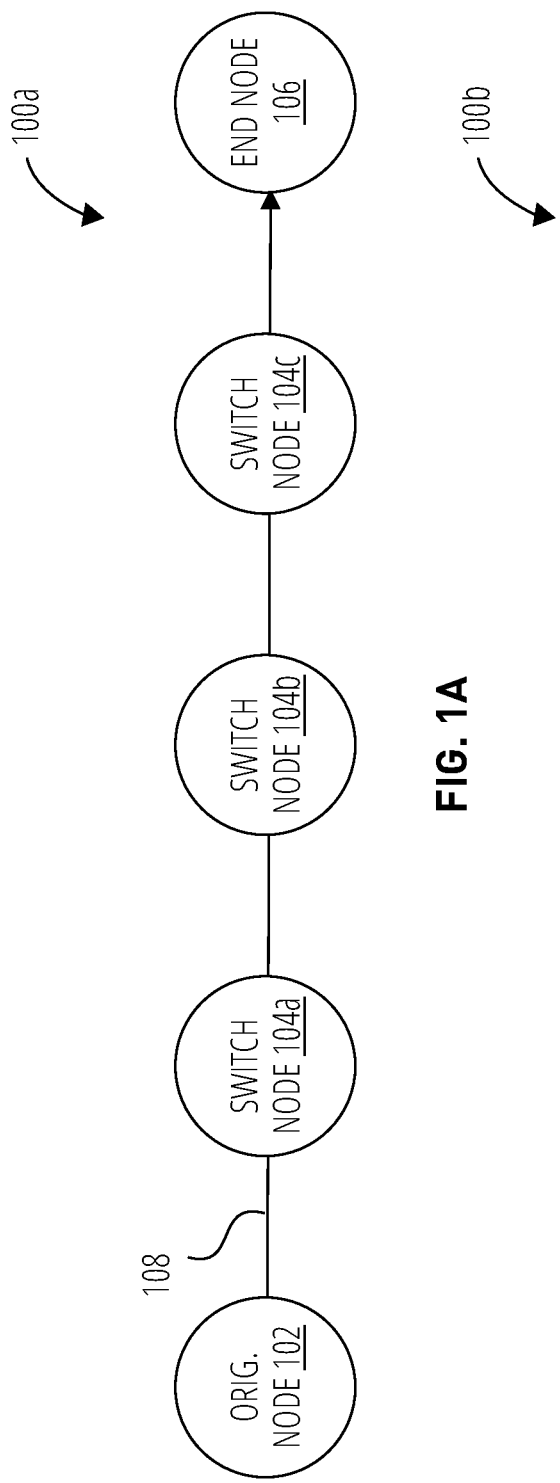

The present disclosure is generally directed to time management techniques for intrusion detection systems (IDSs) designed to reduce interference or detect attack vectors for systems operating based on TSN. As noted, TSN defines a set of standards (and amendments) with the aim to enable time synchronization and deterministic data delivery in converged networks where TC traffic coexists with other types of traffic. Various standards have been developed to address time-sensitive communications. Three of the more prominent standards for enabling time-sensitive communications are promulgated by the Institute of Electrical and Electronics Engineers (IEEE). For example, IEEE 1588, IEEE 802.1AS and IEEE 802.1Qbv provide systems and methods for synchronizing device clocks. In particular, IEEE 1588 provides a protocol for time synchronization across a network; IEEE 802.1AS provides a protocol for time synchronization across a TSN, where time sensitive devices (e.g., followers) synchronize to a leader clock; and IEEE 802.1Qbv provides for prioritizing TC traffic in the network switches using gate-controlled lists (GCLs).

In time sensitive networks, if an attacker located on a network device (e.g., switch or relay) modifies a critical attribute on a specific port, then all downstream nodes from that network device will suffer a desynchronization event. Therefore, it becomes important to detect and localize an attack as quickly as possible. Furthermore, upon detection, it becomes important for the TSN to quickly isolate the compromised network device and thereby prevent the desynchronization attack from spreading to downstream nodes.

To solve these and other problems, embodiments implement IDSs throughout a TSN in order to rapidly detect and localize an attacker. When an IDS detects and localizes the attacker, knowledge of network topology is leveraged to isolate the compromised network device and prevent propagation of the desynchronization attack. The network device downstream from the compromised network device drops malicious messages (e.g., time synchronization messages), which stops the attack from spreading to other network devices on the TSN. The downstream network device also notifies other network devices (e.g., switches or relays) attached to the compromised network device to further isolate the compromised network device. The other network devices can then update network paths and routing tables for the TSN to avoid the compromised network device. The IDSs are subsequently adjusted to accommodate a new network configuration or topology. For example, updates are made to inferencing models used by the IDSs based on the reconfigured network topology of the TSN.

At a high level, various embodiments are generally directed to a TSN network with one or more grand clock leaders, clock followers, and relays or switches. Each relay uses an IDS to detect and localize desynchronization attacks. Assume an attacker attempts to control a relay to insert malicious clock synchronization messages downstream from the grand clock leader. At each relay, the IDS examines timing messages to detect a desynchronization message. Upon detection, the relay drops the message to prevent the spread of the attack and notify the nodes neighboring the malicious relay. All neighboring nodes to the compromised node disconnect, isolating the compromised node. Network segments that are severed from the grand clock leader are reconnected and a new minimum spanning tree for clock synchronization is established. Each node on the new spanning tree path adjusts an IDS inference model to account for network topology changes (e.g. new peer-delay and correction field times).

In one aspect, for example, a device in a TSN may include processing circuitry and memory. The memory can store instructions that when executed by the processing circuitry causes the processing circuitry to establish or participate in a data stream between devices in a network domain of the TSN. The data stream includes or traverses a plurality of switch nodes (or relay nodes) in the TSN. The device can be, for example, one of the switch nodes or another device in the TSN. The device receives messages from another device operating in the same network domain. For instance, the device can be implemented as a clock follower (CF), while the other device can be implemented as a clock leader (CL) in the TSN. Typically, the CL device sets timing for the network domain, and the CF device synchronizes its internal clock time to the same internal clock time of the CL device through a series of time synchronization and time update messages. In general, the messages include time information to synchronize a clock for the CL device and a clock for the CF device to a shared or common network time across the entire network domain. When a CF device receives a timing message, the CF device updates a correction field for the received message with a residence time and time delay value by the CF device. An IDS for the CF device then examines the message and determines whether the updated message is benign or malicious. The IDS updates the correction field for the updated message with an inference time when the updated message is benign, and passes it on to the next device in the path. The inference time is, in general, an estimated time for the IDS to process the message. It can be measured in real-time or derived from an inference model used by some or all of the devices in the network domain. Alternatively, the IDS prevents relay of the updated message to other devices in the network domain when the updated message is malicious, such as dropping it from an egress message queue for another device in the network domain. These and other embodiments are described herein.

FIG. 1A depicts a network 100a implemented according to a TSN standard (e.g., IEEE 1588, IEEE 802.1AS, IEEE 802.1Qbv, or the like). As depicted, network 100a includes origination node 102, switch nodes 104a, 104b, and 104c, and end node 106, all communicatively coupled via communication channel 108. It is noted that the number of nodes in network 100a is selected for purposes of clarity and not limitation. In practice, network 100a can include any number and combination of nodes (e.g., origination nodes, switches, relay nodes, end devices, etc.). Nodes in network 100a (e.g., origination node 102, switch node 104a, switch node 104b, and switch node 104c, etc.) are provided a GCL table, which specifies timing for windows in which the nodes can transmit packets on communication channel 108.

Switch nodes 104a, 104b, and 104c can be any number of devices in a network arranged to communicate, such as for example, electronic control units in an autonomous vehicle, an industrial system, a medical system, or the like. Additionally, communication channel 108 can be any of a variety of communication channels, including wired or wireless communication channels. In some implementations, all devices in network 100a will receive GCL tables. However, in some implementations, only origination nodes (e.g., origination node 102) and switching nodes (e.g., switch node 104a, etc.) receive GCL tables while destination devices (e.g., end node 106) do not receive a GCL table.

Figure 1B:
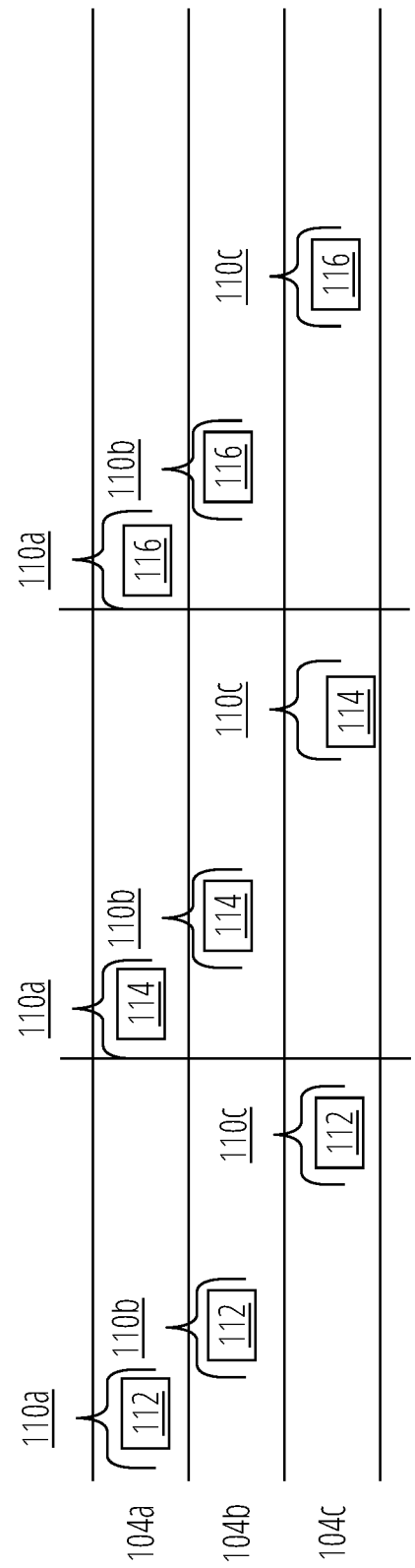
FIG. 1B illustrates a timing diagram 100b.

Typically, GCL tables are generated in a network controller (not shown) and are designed to prioritize TC traffic and prevent lower priority traffic from accessing communication channel 108, thus guaranteeing the timely delivery of TC packets within pre-configured time windows. FIG. 1B depicts a timing diagram 100b depicting communication windows (e.g., Qbv windows, or the like) for switches of network 100a based on GCL tables. In particular, timing diagram 100b depicts Qbv windows 110a, 110b, and 110c in which packets 112, 114, and 116 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 112, etc.) during protected windows (e.g., Qbv window 110a, etc.), nodes in network 100a are time synchronized and scheduled to transmit TC packets (e.g., packet 112, etc.) using non overlapping protected windows (e.g., Qbv window 110a, etc.). It is to be appreciated that providing latency bounded communication (e.g., as depicted in timing diagram 100b) requires tight synchronization of time between nodes in network 100a. With such dependency on time synchronization, reliable TSN operation can be disrupted by attacking the timing of the network, sometimes referred to as a desynchronization attack or event.

Figure 2A:
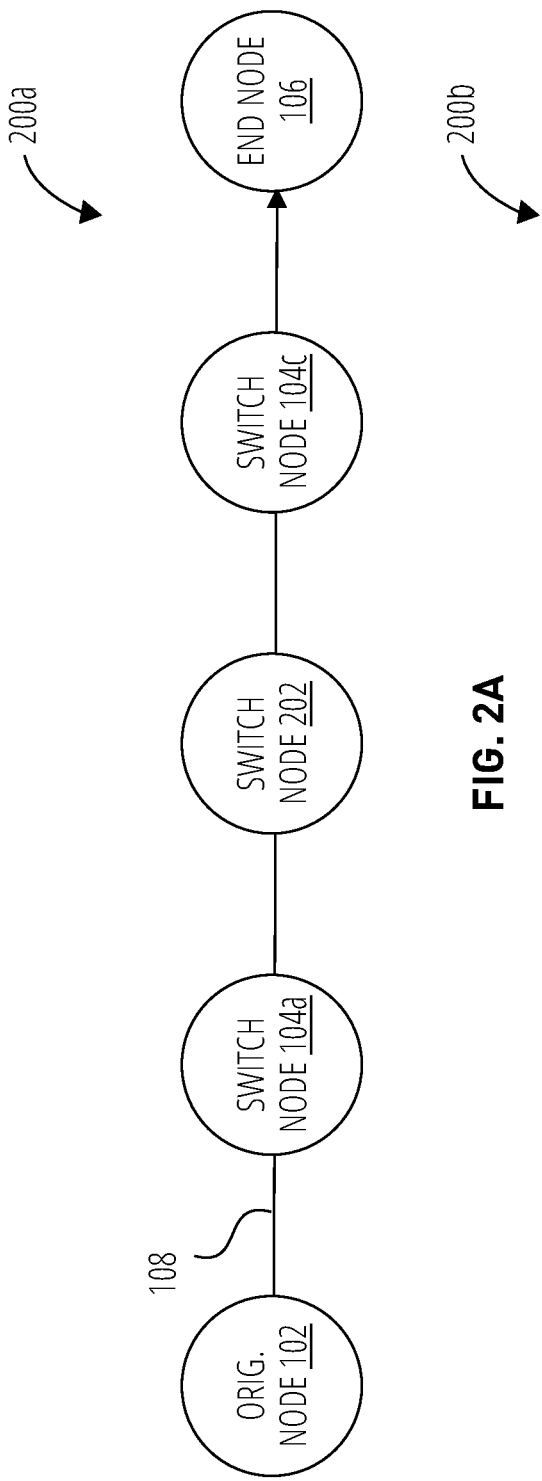

FIG. 2A depicts a network 200a, which is like network 100a except that switch switch node 202 is depicted as compromised. In particular, the clock (not shown) of switch node 202 can be attacked and compromised, thereby causing the Qbv window 110b associated with switch node 202 to be misaligned with respect to, and even overlap with, the protected windows of the other switch nodes in the data stream path (e.g., along communication channel 108).

Figure 2B:
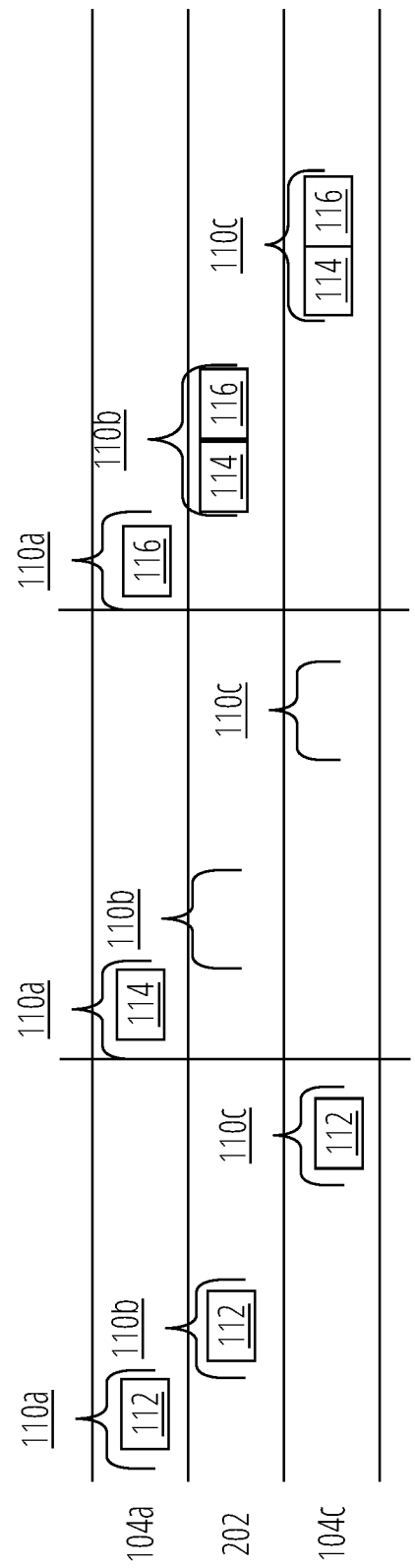
FIG. 2B illustrates a timing diagram 200b.

FIG. 2B depicts timing diagram 200b illustrating Qbv window 110b misaligned with Qbv window 110a and Qbv window 110c and overlapping with Qbv window 110a. As a result, packets (e.g., packet 114 in the figure) arrive too late with respect to the attacked switch protected window (e.g., Qbv window 110b) causing them to be buffered and sent in the next protected window. As a result of the delay in transmitting packet 114, switch node 202 breaks the latency bound of the stream that it is serving and can result in errors or comprise the safety of the system in which the nodes are operating.

The present disclosure provides to detect attacks against networks operating under TSN protocols, such as, networks operating in accordance with IEEE 802.1Qbv. In particular, the present disclosure provides systems and methods to detect attacks that directly affect timing of a TSN network, such as IEEE 802.1Qbv scheduling, for example. In general, the present disclosure provides detection of time synchronization misbehavior in networks operating in accordance with TSN protocols using an intrusion detection system (IDS). An IDS can be implemented for each device in a network domain of a TSN. Alternatively or additionally, an IDS can be implemented for sets of devices or all devices in a network domain of a TSN. The present disclosure uses IEEE 1588, IEEE 802.1AS and/or IEEE 802.1Qbv as the TSN protocols. However, it is noted that examples described herein can be applied to other TSN protocols different from these exemplary protocols.

With some examples, systems and methods are described that detect misbehavior of TSN compliant networks based on an IDS configured to inspect messages communicated within a network domain of the TSN compliant network. The IDS is designed to inspect each message that passes through a given device and determine whether the message is a benign or a malicious message. When the IDS detects a benign message, it is updated with an inference time and relayed to other devices in the same network domain. When the IDS detects a malicious message, however, it immediately drops the message from the network to prevent transmission to other devices within the same network domain.

For example, a malicious message may be a message with characteristics or properties that indicate one or more devices of the TSN compliant network is under attack.

It is worthy to note that TSN compliant networks utilize measurement attributes with a higher granularity in the time domain relative to normal communications networks. As such, implementing an IDS for one or more devices in a TSN will have a cumulative effect on timing of packets as they traverse the TSN. The implementation of IDSs throughout the TSN provides a real benefit by increasing responsiveness of detecting threats. A TSN utilizing a scheduling solution for IEEE 802.1Qbv and a clock synchronization interval for IEEE 1588 and IEEE 802.1AS has a time synchronization interval typically measured in the order of seconds to 100s of milliseconds while scheduled windows for IEEE 802.1Qbv can have scheduling intervals 2 orders of magnitude lower (e.g., periodicity in the order of single digit milliseconds or even microseconds). Consequently, an IDS for each device will reduce detection time of an attack or threat, thereby increasing a probability of isolating a device under attack before it impacts critical timing of other devices in the TSN. This benefit, however, comes at a cost of messages traversing an IDS for inspection and detection of malicious characteristics or metrics. Accordingly, each device implementing an IDS must carefully and precisely account for an amount of processing time associated with processing a message by the IDS, referred to herein as an inference time, and update the message with the inference time. In this manner, other devices can utilize the cumulative inference times of a given message to adjust timing characteristics within the TSN. In other words, the inference time is needed for devices in the TSN to account for timing differences introduced by the various IDSs.

Figure 3:
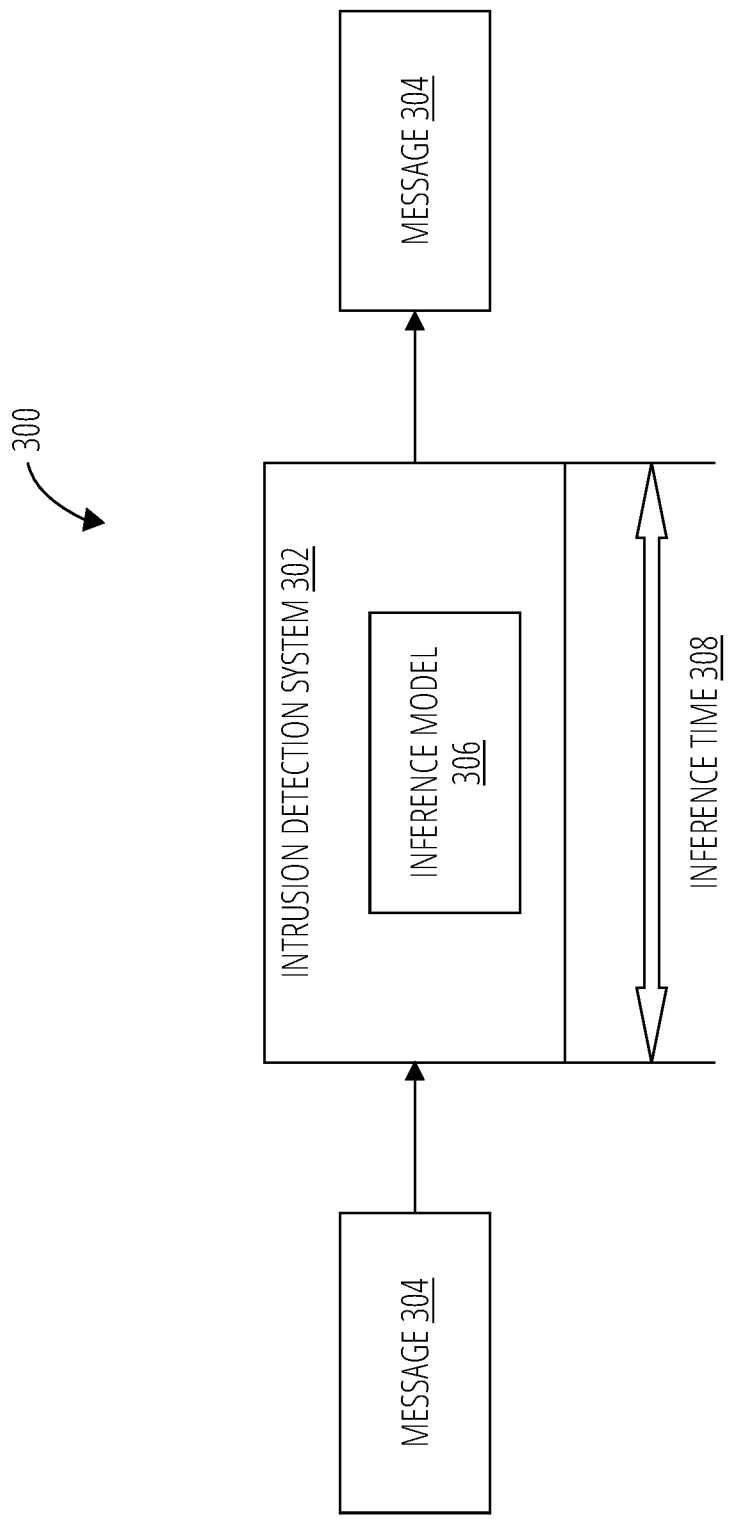
FIG. 3 illustrates an apparatus 300.

FIG. 3 depicts an exemplary intrusion detection system (IDS) 302 suitable for use with a TSN network, such as networks 100a, 100b. As shown in FIG. 3, a message 304 is received by the IDS 302. The message 304 may comprise, for example, a timing message for a TSN network. The timing message may be defined by a standard, such as IEEE 1588 and/or IEEE 802.1AS, for example. The IDS 302 determines whether the message 304 is benign or malicious. If benign, the IDS 302 updates the message 304 with an inference time 308. The IDS 302 may generate the inference time 308, for example, using an inference model 306. As depicted in FIG. 3, the inference time 308 is an estimated time it takes to traverse the IDS 302, such as from ingress to the IDS 302, processing by the IDS 302, and egress from the IDS 302. The IDS 302 then outputs the updated message 304 for transmission along the network path. If malicious, however, the IDS 302 drops the message 304, thereby preventing further relay along the network path.

In general, the IDS 302 is a device or software application that monitors a device, network or systems for malicious activity or policy violations. Any intrusion activity or violation is typically reported either to other devices in the same network, an administrator, and/or collected centrally using a security information and event management (SIEM) system. A SIEM system combines outputs from multiple sources and uses alarm filtering techniques to distinguish malicious activity from false alarms.

In one aspect, the IDS 302 is implemented for a specific device within a TSN network, such as one or more of devices 102, 104, 106 and/or 202 in networks 100a, 100b. For example, the IDS 302 may be specifically tuned to detect a timing attack, such as a desynchronization attack, or other TSN specific attack vector. In some instances, the IDS 302 may be implemented for a set of devices, such as switch nodes 104a-104c.

The IDS 302 can operate in an on-line or off-line mode. When operating in an on-line mode, the IDS 302 examines network traffic in real time. It performs an analysis of passing traffic on the entire subnet, and matches the traffic that is passed on the subnets to the library of known attacks. For instance, it analyses the message 304 (e.g., a TSN timing message) and applies some rules, to decide if it is an attack or not. Off-line mode typically deals with stored data and passes it through some processes to decide if it is an attack or not. For the offline case, rather than using an inference model 306, a message may be replicated for offline analysis. It may be replicated in hardware without incurring a memory copy. However, a software solution may copy the message from the queue for later analysis. In either mode, once an attack is identified, or abnormal behavior is sensed, an alert can be sent to a STEM, a network administrator, or a software application to automatically implement security protocols, such as dropping the message 304, isolating an infected device guarded by the IDS 302, and/or re-configuring one or more network paths for impacted devices in the TSN network.

The IDS 302 can utilize any number of different detection methods to detect an attack. For instance, the IDS 302 may implement a signature-based method, a statistical anomaly-based method, a stateful protocol analysis method, or some combination of all three methods. A signature-based IDS monitors packets in the network and compares with pre-configured and pre-determined attack patterns known as signatures. A statistical anomaly-based IDS monitors network traffic and compares it against an established baseline. The baseline will identify what is "normal" for that network, such as what sort of bandwidth is generally used and what protocols are used. For instance, ensemble models that use Matthews correlation co-efficient to identify unauthorized network traffic have obtained 99.73% accuracy. A stateful protocol analysis IDS identifies deviations of protocol states by comparing observed events with defined profiles of generally accepted definitions of benign activity. It will be appreciated that these detection methods are by way of example and not limitation. Other embodiments may use different detection methods as well. The embodiments are not limited in this respect.

Figure 4A:
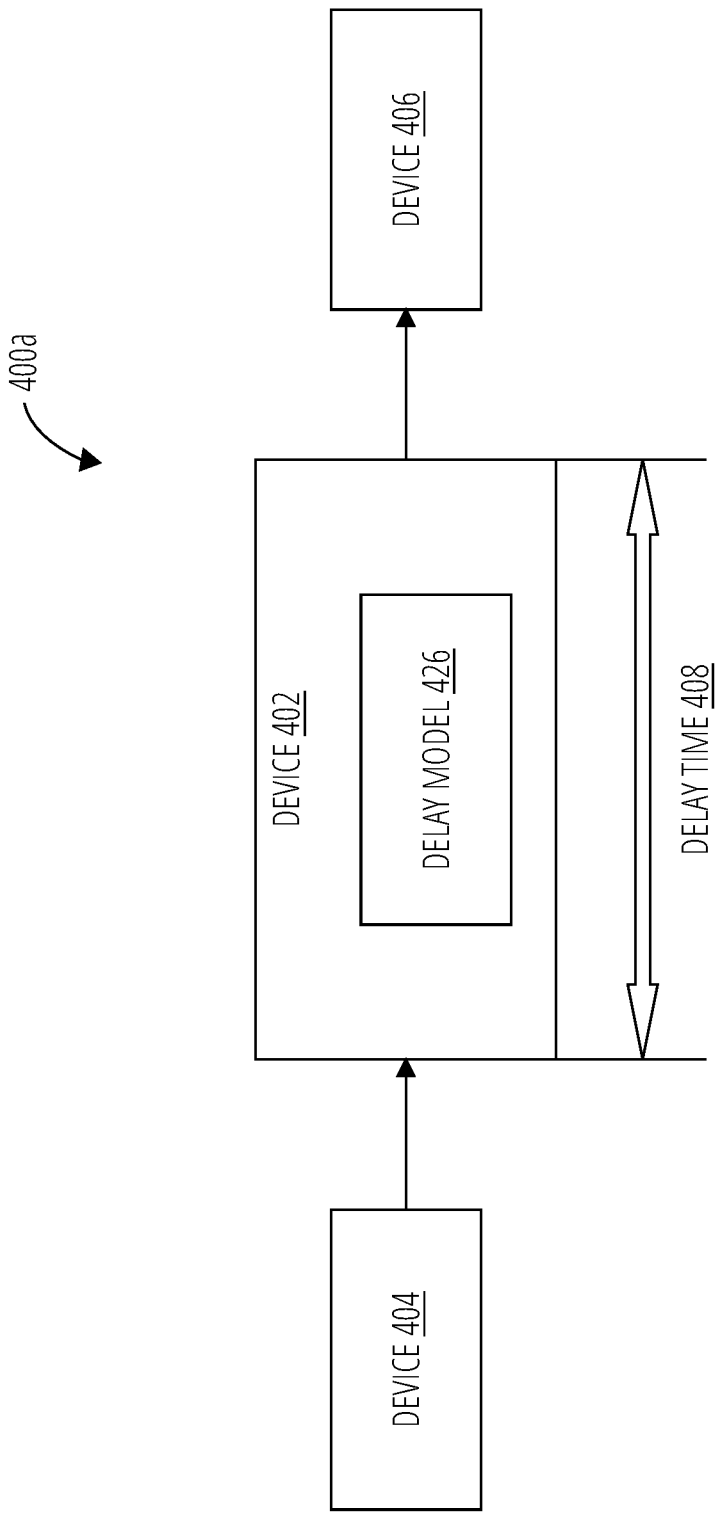

FIG. 4A depicts a system 400a. The system 400a may represent a three device subset of a TSN network, which includes the device 402 communicatively coupled to a device 404 and a device 406. The device 404 may send a message, such as message 304, to an input port or ingress port of the device 402. The device 402 may implement an IDS similar to the IDS 302 discussed with reference to FIG. 3. The device 402 may receive the message 304 at the ingress port, and perform normal switching or routing operations for a TSN network, such as process the message 304 to determine a next hop. The device 402 then outputs the message 304 from an output port or an egress port. An amount of time for the device 402 to receive, process and output the message 304 is referred to as a delay time 408. Similar to the inference time 308, the device 402 may measure the delay time 408 in real-time or estimate it from a model, such as a delay model 426. The delay time 408 may be added to the message 304 to assist other devices in adjusting timing for a TSN network.

In some embodiments, the delay time 408 is separate from, and does not include, the inference time 308 associated with the IDS 302. In other embodiments, the delay time 408 and the inference time 308 can be combined into a single delay time for the device 402. In this case, the delay model 426 and the inference model 306 can be combined into a single model for the device 402.

Figure 4B:
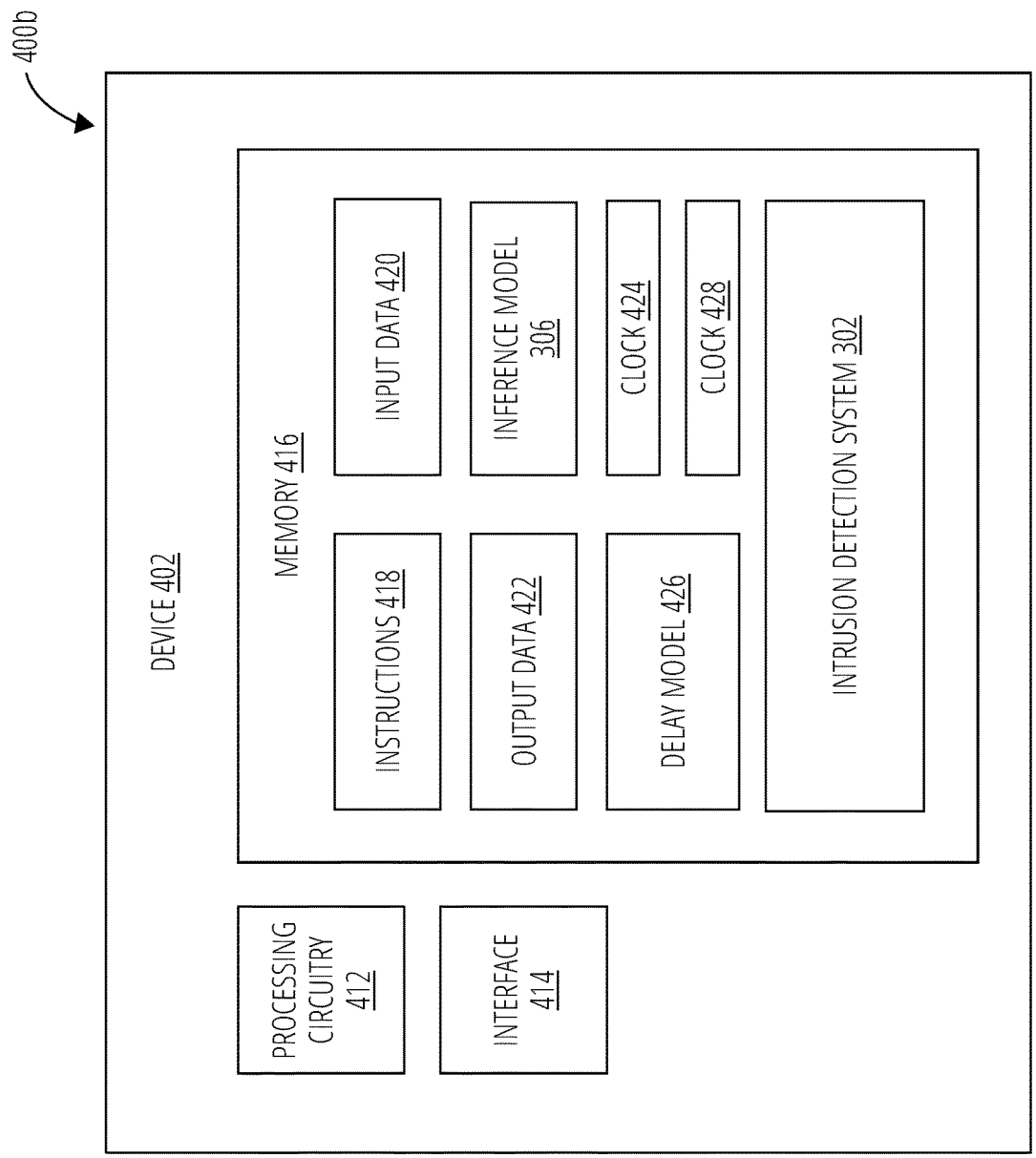
FIG. 4B illustrates a system 400b.

FIG. 4B depicts a system 400b. The system 400b is similar to the system 400a, and it provides a more detailed block diagram for the device 402 discussed with reference to FIG. 4A. The device 402 is representative of any number and type of devices, arranged to process messages in a TSN network. More particularly, the device 402 includes a processing circuitry 412, an interface 414 and a memory 416. The memory 416 includes a set of instructions 418, input data 420, output data 422, an inference model 306, a delay model 426, and an internal clock 424. The memory 416 further includes the IDS 302.

The processing circuitry 412 may include circuitry or processor logic, such as, for example, any of a variety of commercial processors. In some examples, the processing circuitry 412 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 412 may include graphics processing portions and may include dedicated memory, multiple-threaded processing and/or some other parallel processing capability. In some examples, the processing circuitry 412 may be an application specific integrated circuit (ASIC) or a field programmable integrated circuit (FPGA). In some examples, the processing circuitry 412 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 416 may be arranged to form one or more types of memory, such as, for example, dynamic random access memory (DRAM), NAND memory, NOR memory, or the like.

Interface 416 may include logic and/or features to support a communication interface. For example, the interface 416 may include one or more interfaces that operate according to various communication protocols or standards to communicate over direct or network communication links. Direct communications may occur via use of communication protocols or standards described in one or more industry standards (including progenies and variants). For example, the interface 416 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, interface 414 may be arranged to support wireless communication protocols or standards, such as, for example, Wi-Fi, Bluetooth, ZigBee, LTE, 5G, or the like.

As shown in FIG. 4B, the memory 416 contains various timing components for a TSN. The delay model 426 may estimate or calculate a delay time 408 for the device 402. The inference model 306 may estimate or calculate an inference time 308 for the IDS 302. The IDS 302 can inspect messages to determine whether a message is benign or malicious, and process the message accordingly.

In some embodiments, the device 402 may implement a single clock. As shown in FIG. 4B, for example, the device 402 may implement a clock 424. The clock 424 can perform timing operations for the device 402, such as synchronizing a time with a shared or common time in a TSN. The clock 424 can also measure delay time 408 for the device 402 and/or the inference time 308 for the IDS 302.

In some embodiments, the device 402 may have multiple clocks or clock components. A first clock, such as the clock 424, may be synchronized to a common network time for a TSN. The device 402 may also have a second clock, such as a clock 428. The clock 428 may be implemented as a monotonic clock to measure the delay or inference time (e.g., time/day clock vs stopwatch). This multiple clock configuration may be implemented as an additional security measure. The device 402 should not use the same clock used for synchronization to measure inference/delay since it may be under the influence of an attacker. A monotonic clock is a free running clock, that is, not synchronized with another clock. The second monotonic clock can be used for updating the correction field since it cannot be influenced by the attacker in a timing attack.

Figure 4C:
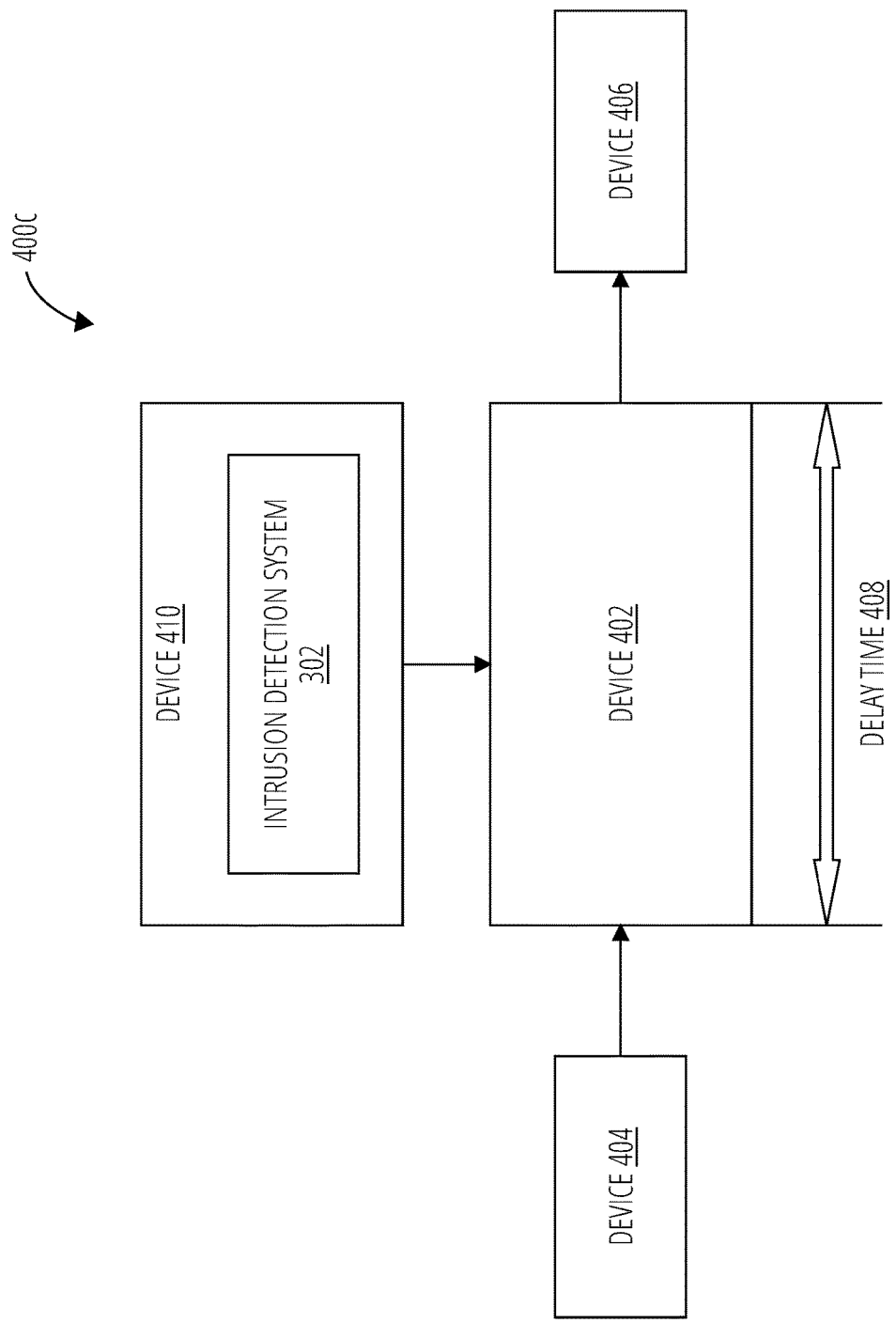
FIG. 4C illustrates a system 400c.

FIG. 4C depicts a system 400c. The system 400c is similar to systems 400a, 400b. The system 400c illustrates a configuration where the IDS 302 monitors messages for the device 402. However, the IDS 302 is implemented in a separate device 412. In this configuration, the inference time 308 for the IDS 302 is calculated or estimated by an inference model 306 implemented for the device 410. The device 402 may pass a message to the device 410 for inspection by the IDS 302. The IDS 302 of the device 410 may inspect the message, and determine whether the message is benign of malicious. If benign, the device 410 may update the message with the inference time 308, and either pass the message back to the device 402 for routing to the device 406, or alternatively, route the message to device 406 directly from the device 410. If malicious, the device 410 may drop the message, or pass the message to device 402 with a tag indicating it is malicious to allow the device 402 to process accordingly.

Figure 5A:
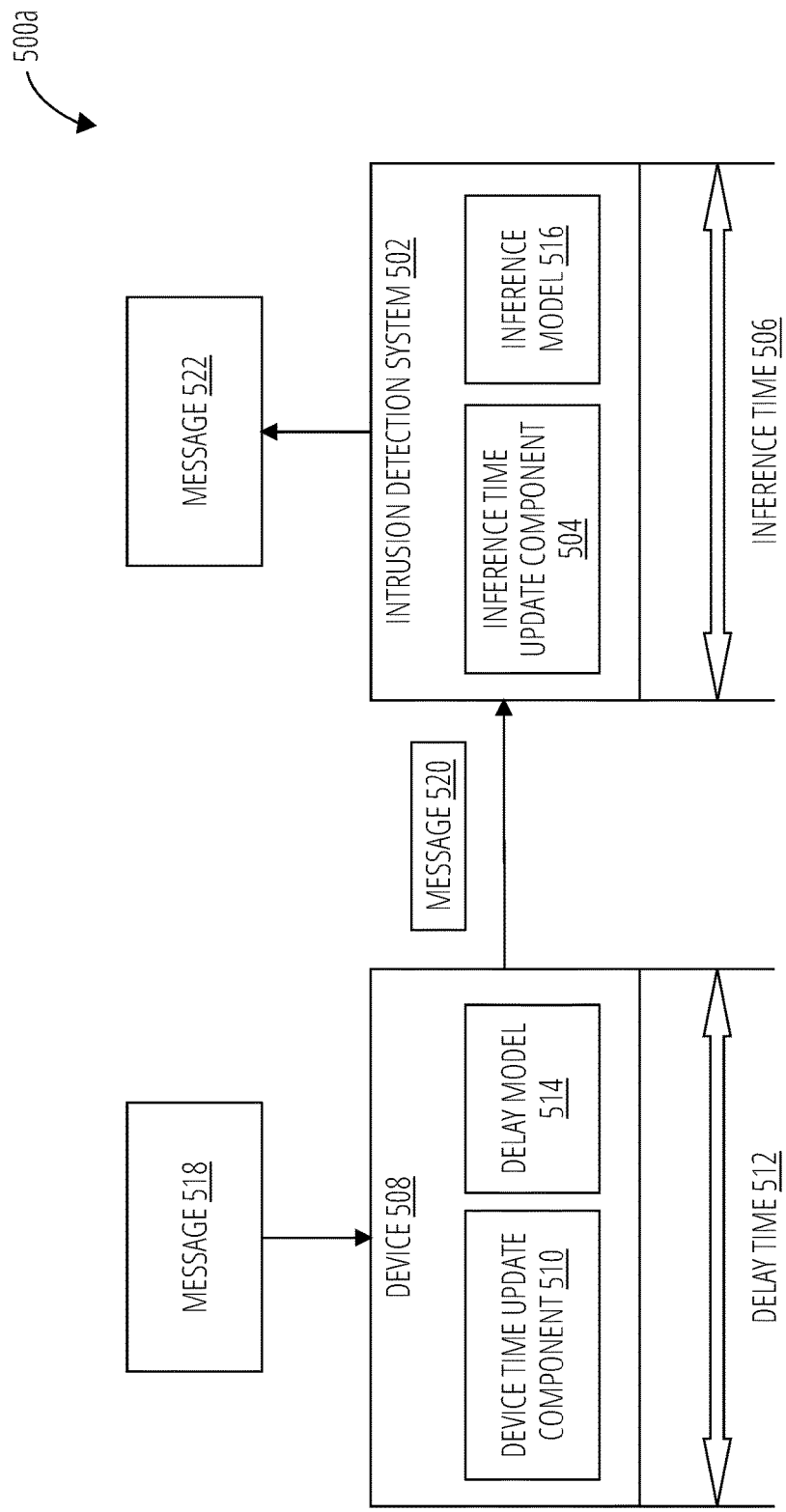

FIG. 5A depicts a system 500a. The system 500a comprises a device 508. The device 508 is similar to device 402 as discussed with reference to FIGS. 4A-4C. The device 508 includes a device time update component 510. The device time update component 510 generates a delay time 512 to traverse the device 508. The device time update component 510 generates the delay time 512 through real-time measurement or the delay model 514. When the device 508 receives a message 518 at an ingress port for the device 508, it processes the message 518 according to its given message type. For instance, if the message 518 includes data for delivery to another device, the device 508 looks up routing or switching information to identify a next hop in the network path to the other device. If the message 518 is a timing message, the device 508 synchronizes a clock for the device 508 with timing information from the message 518. In either case, the device time update component 510 updates the message 518 with the delay time 512 to form an updated message 520. The device 508 then sends the message 520 to an IDS 502 for the device 508. The IDS 502 may comprise part of the same device 508 similar to the configurations shown in FIGS. 4A, 4B. Additionally or alternatively, the IDS 502 may be implemented in a different device from the device 508, similar to the configuration shown in FIG. 4C.

The IDS 502 may receive the message 520, and inspect the message 520 to determine whether it is benign or malicious. If benign, an inference time update component 504 for the IDS 502 generates an inference time 506. The IDS 502 generates the inference time 506 either through real-time measurement or from the inference model 516. The IDS 502 updates the message 520 with the inference time 506 to form an updated message 522. The IDS 502 of the device 508 then routes or switches the message 522 to an egress queue for an egress port that leads to the next device in the network path for the message 522.

Figure 5B:
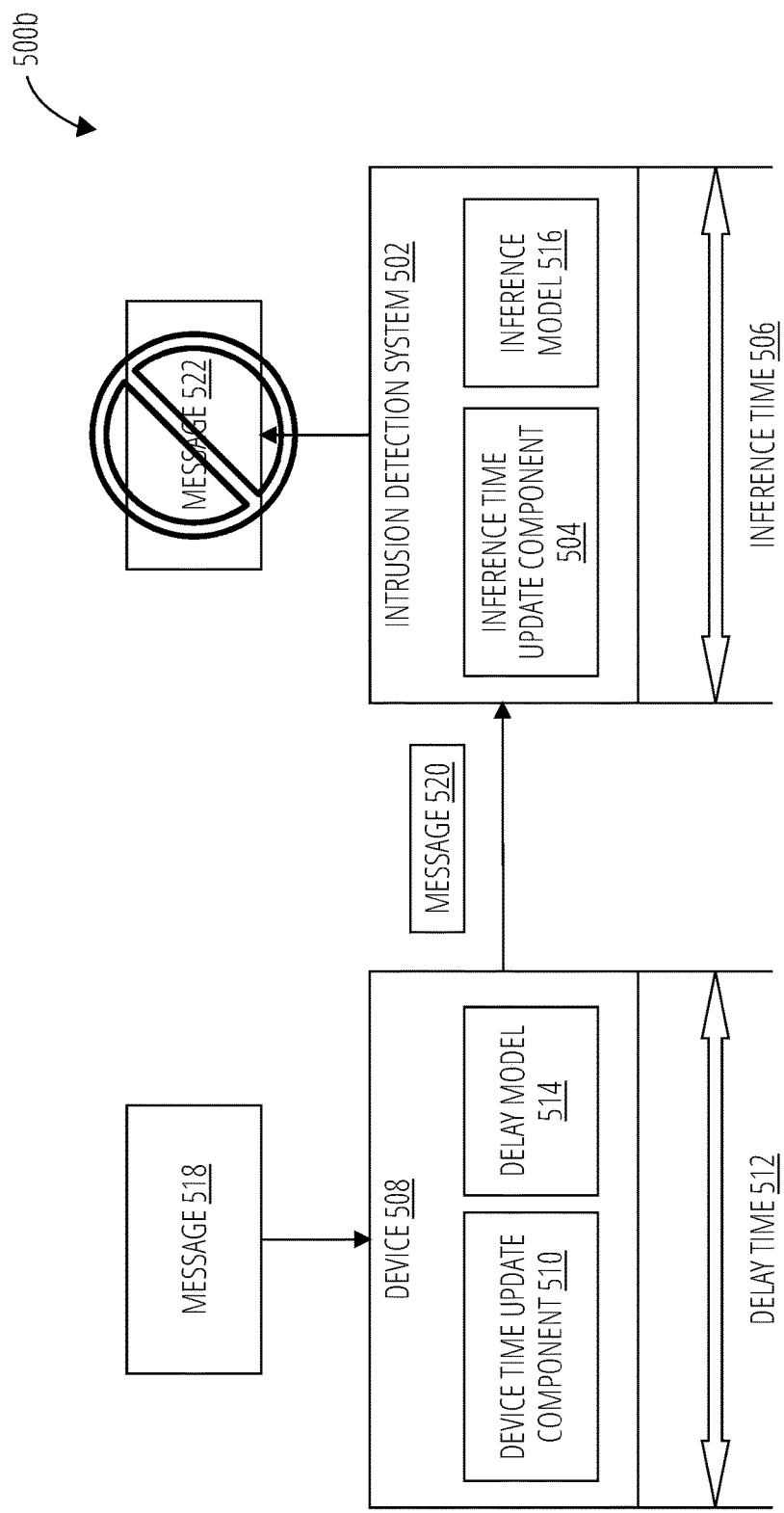
FIG. 5B illustrates a system 500b.

FIG. 5B depicts a system 500b. The system 500b is similar to system 500a, and illustrates a case where the IDS 502 determines the message 518 is malicious. Upon determining that the message 518 is malicious, the IDS 502 and/or the device 508 drops the message 518 to prevent relay to other devices in the TSN. The IDS 502 and/or the device 508 also sends out alert messages to an administrator, SIEM, or other devices in the TSN network or network domain.

As previously described, in general, embodiments are directed to a TSN network with one or more grand clock leaders, clock followers, and relays or switches. Each relay uses an IDS to detect and localize desynchronization attacks. Assume an attacker attempts to control a relay to insert malicious clock synchronization messages downstream from the grand clock leader. At each relay, the IDS examines timing messages to detect a desynchronization message. Upon detection, the relay drops the message to prevent the spread of the attack and notify the nodes neighboring the malicious relay. All neighboring nodes to the compromised node disconnect, thereby isolating the compromised node. Network segments that are severed from the grand clock leader are reconnected and a new minimum spanning tree for clock synchronization is established. Each node on the new spanning tree path adjusts an IDS inference model to account for network topology changes (e.g. new peer-delay and correction field times). An example of an attack and subsequent security measures will be further described with reference to FIGS. 6A-6C and FIGS. 7A-7B.

Figure 6A:
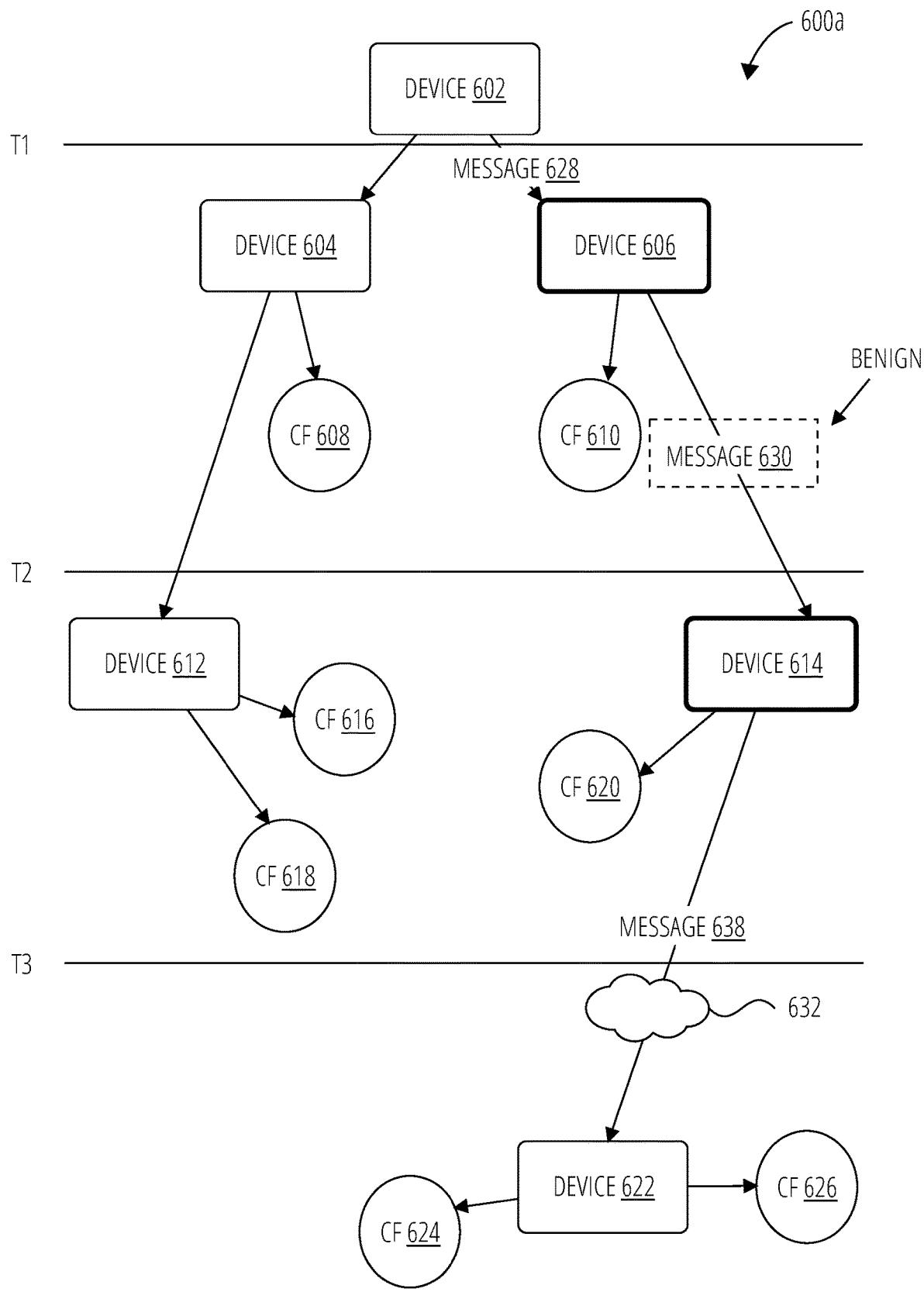

FIG. 6A depicts a network 600a that implements one or more TSN protocols or standards. The network 600a includes multiple devices in a hierarchical network topology, such as devices 602, 604, 606, 608, 610, 612, 614, 616, 618, 620, 622, 624 and 626. The devices may be implemented as part of a vehicle, robot, industrial machine or any other devices suitable for the network 600a. The devices may be implemented as an origination node 102, switch node 104a-104c, switch node 202 and/or end node 106. The devices may be implemented as either a clock leader (CL) or a clock follower (CF) in the network 600a.

The devices in the network 600a may operate in accordance with a timing protocol, such as a precision time protocol (PTP) for IEEE 1588 or IEEE 802.1AS. For instance, the devices in the network 600a may operate in accordance with IEEE 802.1AS which implements a hierarchical network to synchronize clock followers (CFs) to a clock leader (CL) through relays or switch nodes. Synchronization is performed through communication of time messages, such as message 628, message 630 and message 638. The time messages may comprise, for example, time synchronization messages or time update messages for a PTP. The time messages may include, among other fields and attributes, a correction_field, which accumulates a network residence, an inference time for an IDS, and an origin timestamp for a CL. The time message may also comprise, for example, a packet delay (pdelay) message type with additional fields and attributes as previously described.

The network 600a illustrates a case where the network 600a is operating within normal TSN operational parameters and is not under a desynchronization attack. In normal operation, assume the device 602 is a grand clock leader or CL for the network 600a.

At time T1, the device 602 can send the message 628 to a downstream device 606. The device 606 might be a switch node similar to one of the switch nodes 104A-C. Assume the device 606 operates as a CL device for downstream devices. The message 628 might be a timing message for a PTP. The device 606 updates the message 628 (e.g., one or more attributes) to form an updated message 630, and relays the message 630 to one or more clock followers, such as CF 610. The device 606 may also relay the message 628 to another device 614, which might be another switch or relay node, that operates as a CF as well. The scenario depicted in FIG. 6A assumes the message 630 is a benign message, that is, it is a normal TSN message and is not a desynchronization message or part of a desynchronization attack on the network 600a.

At time T2, the device 614 receives the message 630 from the device 606, synchronizes an internal clock for the device 614 using timing information from the message 630, updates the message 630 (e.g., one or more attributes) to form an updated message 638, and relays the message 638 to other downstream devices.

At time T3, the message 638 may continue downstream and traverse N hops, as represented by the cloud network 632. The cloud network 632 will ultimately deliver the message 638 to the device 622, which in turn updates the message 638 for delivery to CF 624 and CF 626.

Figure 6B:
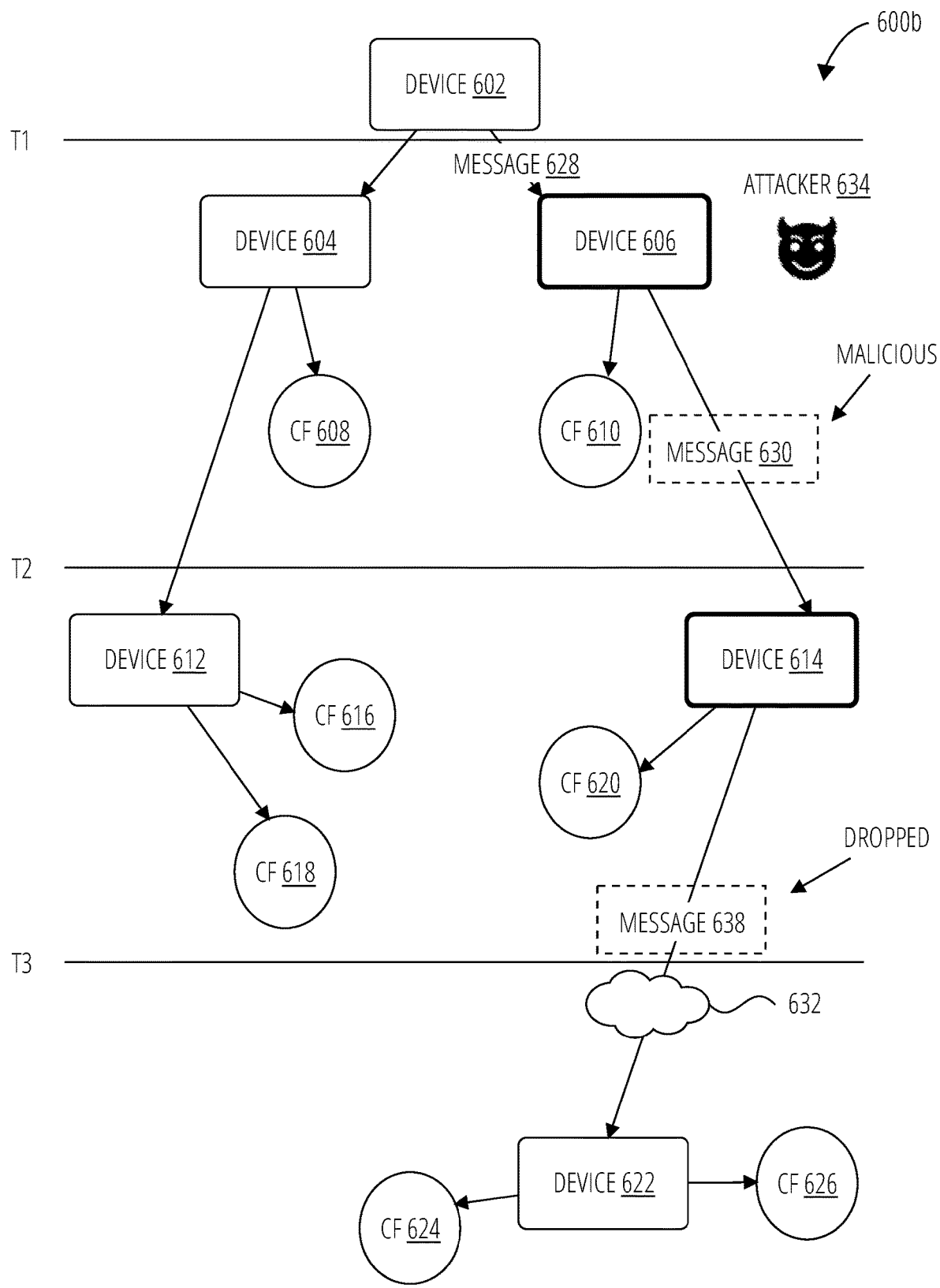
FIG. 6B illustrates a network 600b.

FIG. 6B depicts a network 600b that is similar to the network 600a. However, the network 600b illustrates a case where the network 600b is under a desynchronization attack from an attacker 634. Assume the device 602 is a grand clock leader or CL for the network 600b.

At time T1, the device 602 can send the message 628 to a downstream device 606. The device 606 might be a switch node similar to one of the switch nodes 104A-C. The message 628 might be a timing message for a PTP. The device 606 may update the message 628 (e.g., one or more attributes) to form an updated message 630, and relay the message 630 to one or more clock followers, such as CF 610. The device 606 may also relay the message 628 to the device 614, which might be another switch or relay node, that operates as a CF as well.

The scenario depicted in FIG. 6B at time T1 assumes the message 630 is a malicious message, that is, it is a desynchronization message that is part of a desynchronization attack on the network 600b. In other words, the device 606 may be compromised with malware to update the message 628 with one or more attributes with erroneous or false values. As such, the attacker 634 attempts to propagate the desynchronization attack to other devices or nodes downstream from the compromised device 606, such as to the device 614.

At time T2, the device 614 receives the message 630 from the device 606, and updates the message 630 (e.g., one or more attributes) to form an updated message 638. Instead of relaying the message 638 to other downstream devices, such as CF 620, the device 614 forwards the message 638 to an IDS similar to the IDS 302. The IDS 302 examines the message 638 and detects that it is a malicious desynchronization message from an attacker 634 that has compromised the device 606. Upon detection, the device 614 does not relay the message 630 (as updated message 638) to the cloud network 632, but rather drops the message 630 to prevent propagation of the desynchronization attack to downstream devices in the network 600b. This prevents spreading the desynchronization message to the device 622, CF 624, CF 626 and any other devices attached to the device 614 or in the network 632.

Figure 6C:
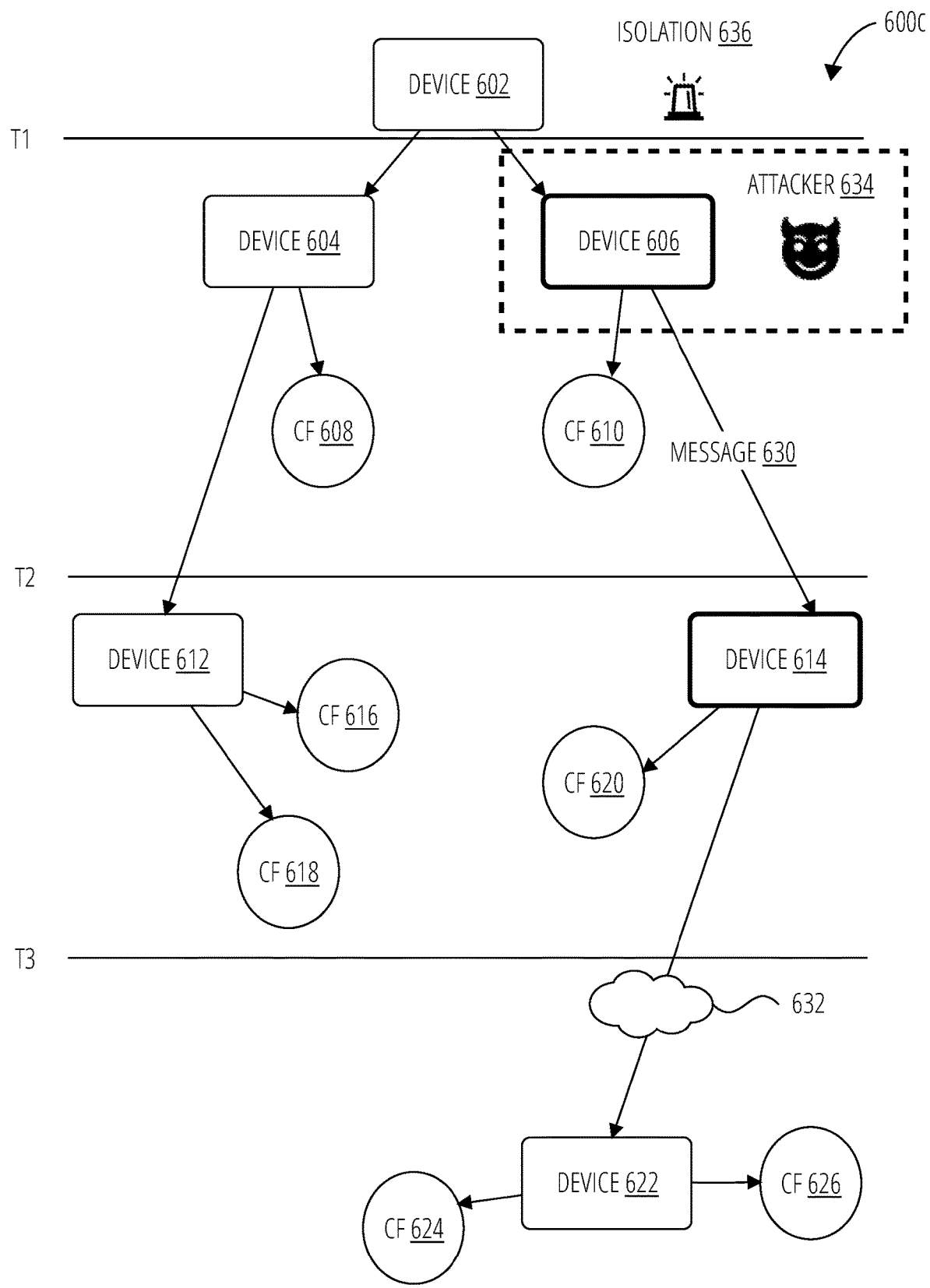
FIG. 6C illustrates a network 600c.

FIG. 6C depicts a network 600c that is similar to the networks 600a, 600b. The network 600c illustrates a case where the device 606 is detected as compromised by the attacker 634, and the device 614 initiates a series of actions in response to detection of the attack. For instance, the device 614 may initiate an isolation protocol for the compromised device 606. Once the IDS 302 for the device 614 detects the desynchronization message 630, the device 614 drops the desynchronization message 630 to prevent the spread of the attack. The device 614 then notifies the devices neighboring the malicious device 606 compromised by the attacker 634. All neighboring nodes to the compromised device 606 disconnects, such as the device 602, the CF 610 and the device 614, thereby placing the compromised device 606 in an isolation mode 636. Isolating the compromised device 606 minimizes any further damage from the desynchronization attack, and allows the network 600c to enter repair mode to sanitize the network 600c from effects of the desynchronization attack. The device 614 may also notify an administrator, SIEM or other security application for the network 600c to activate other emergency security protocols, such as a network reconfiguration protocol to force network reconfiguration that includes updates to network paths and routing tables for devices within the network 600c, an inference model protocol to forces updates to inference models used by IDSs for devices within the network 600c, an attack library protocol to force updates to anti-virus software for devices within the network 600c, and other standard security measures responsive to a security attack or threat.

Figure 7A:
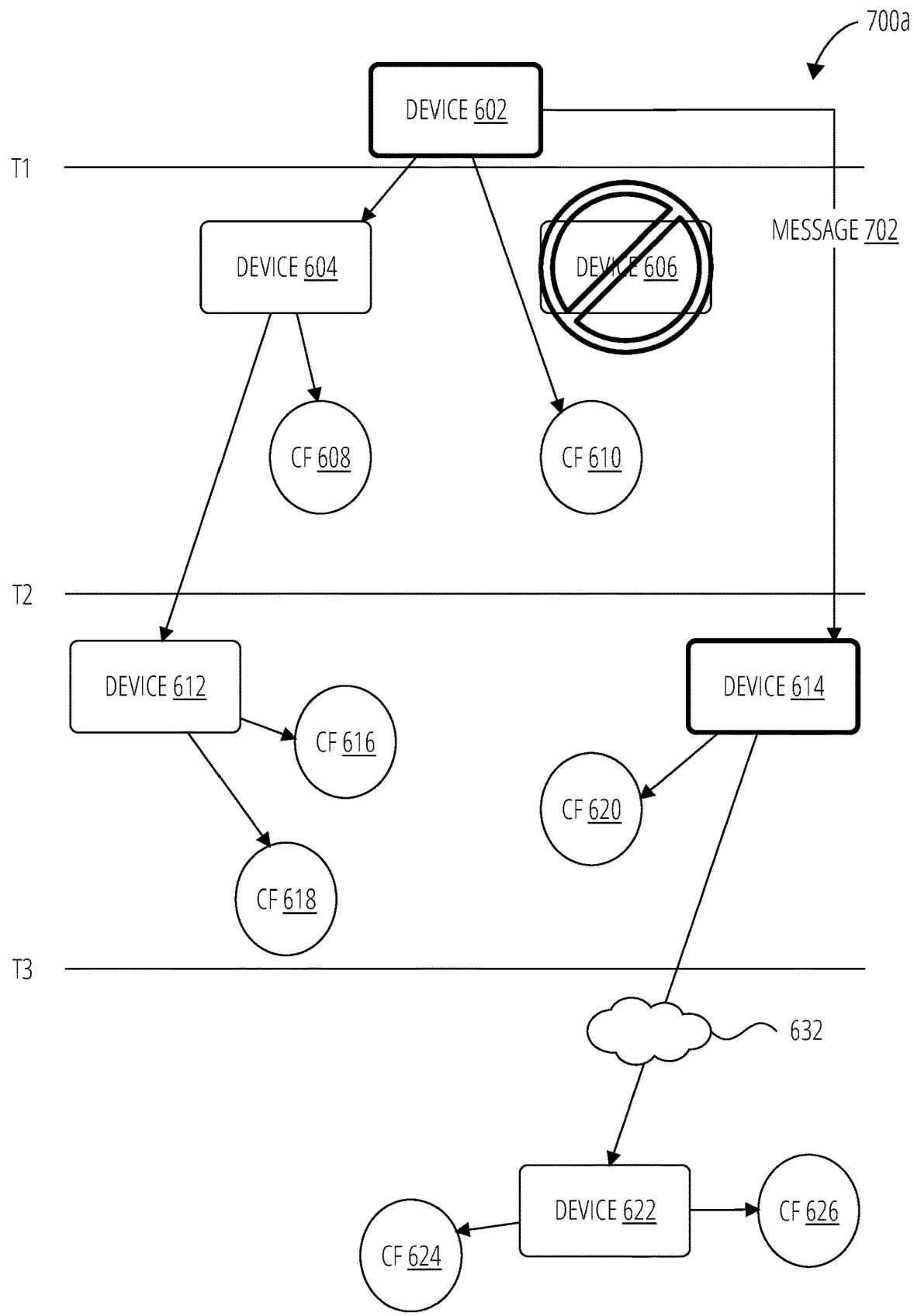

FIG. 7A illustrates a network 700a. The network 700a is similar to networks 600a-600c. The network 700a illustrates a case where the device 614 initiates a network reconfiguration protocol in response to a desynchronization attack by the attacker 634. As previously discussed with reference to FIG. 6C, the compromised device 606 is placed in an isolation mode 636 once the IDS 302 of the device 614 detects the desynchronization attack. In accordance with a network reconfiguration protocol, the devices formerly attached to the compromised device 606 disconnect from the compromised device 606, and reconnect to other devices in the network 700a to ensure continuity of the data streams throughout the network 700a, including timing messages. For instance, the CF 610 disconnects from the compromised device 606 and reconnects to the device 602. Similarly, the device 614 also disconnects from the compromised device 606 and reconnects to the device 602. Since the device 602 was a grand CL for the network 700a, the CF 610 and the device 614 can resume CF roles and synchronize internal clocks using timing messages from the device 602.

Figure 7B:
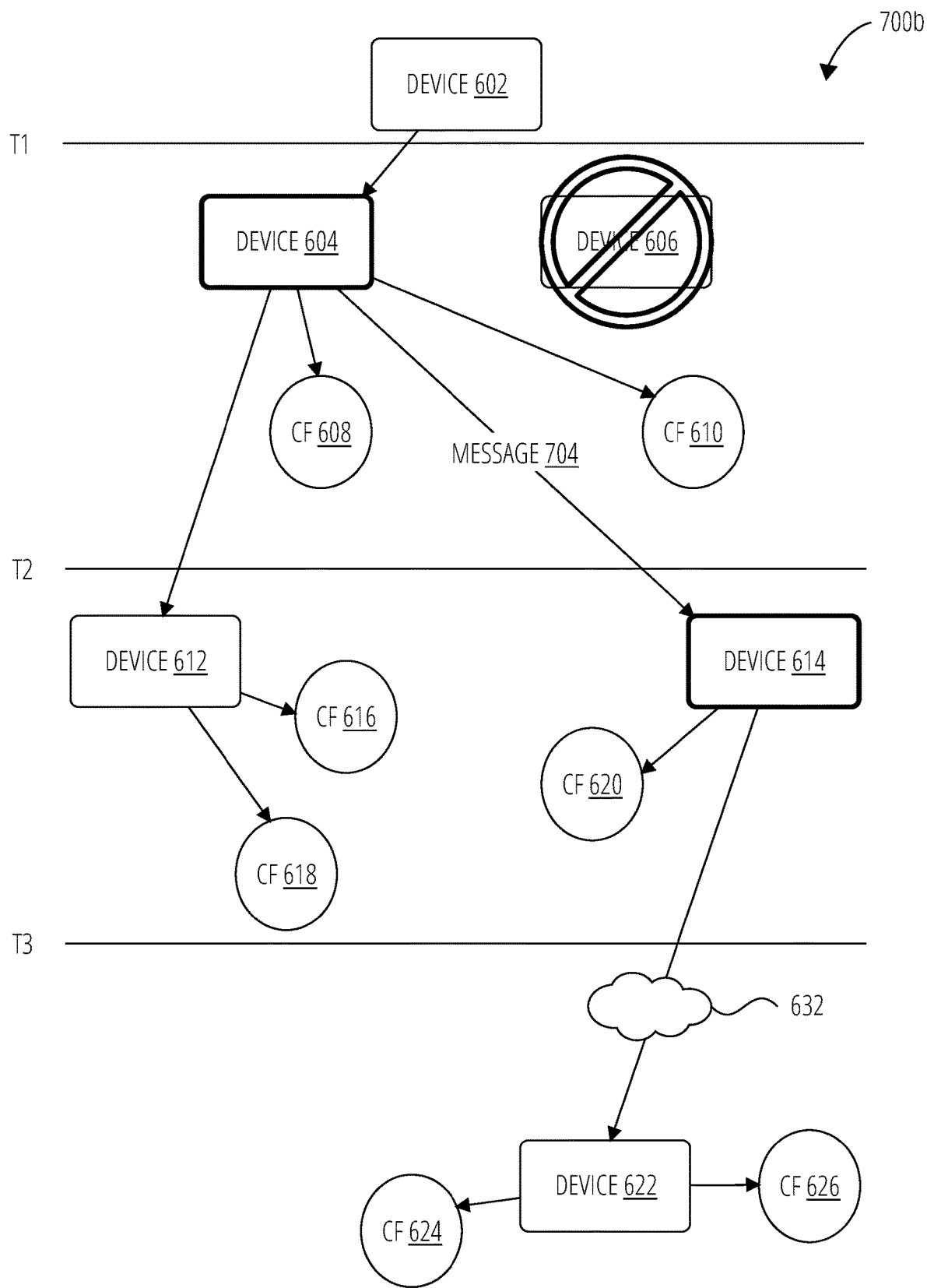
FIG. 7B illustrates a network 700b.

FIG. 7B illustrates a network 700b. The network 700b is similar to network 700a. The CF 610 and the device 614 both disconnect from the compromised device 606. However, instead of reconnecting to the device 602, both devices reconnect with the device 604. The device 604 operates as the new CL for CF 610 and the device 614. In the event the device 604 was not previously operating in a CL role, the device 604 can be modified from a CF role to a CL role for the network 700b.

In some instances, an IDS 302 for a given device may not detect a desynchronization attack quickly enough to restore timing for a given network domain. In other words, when a CF device searches for a new CL device with which to connect, there may be a danger of connecting to another compromised CL device. In such cases, the network reconfiguration protocol may have devices disconnect from a malicious device and reconnect to a CL device that is in an entirely different network domain to ensure the new CL device remains un-compromised.

Whenever a CF device attempts to connect to a new CL device, the new CL device may synchronize its clock with another CL device for the network, such as a grand CL device. However, there is a risk that the grand CL device may itself be compromised. In this case, the network reconfiguration protocol may have both CL devices run independently without synchronization to allow time for other failsafe and recovery measures to be implemented for the network.

Figure 8:
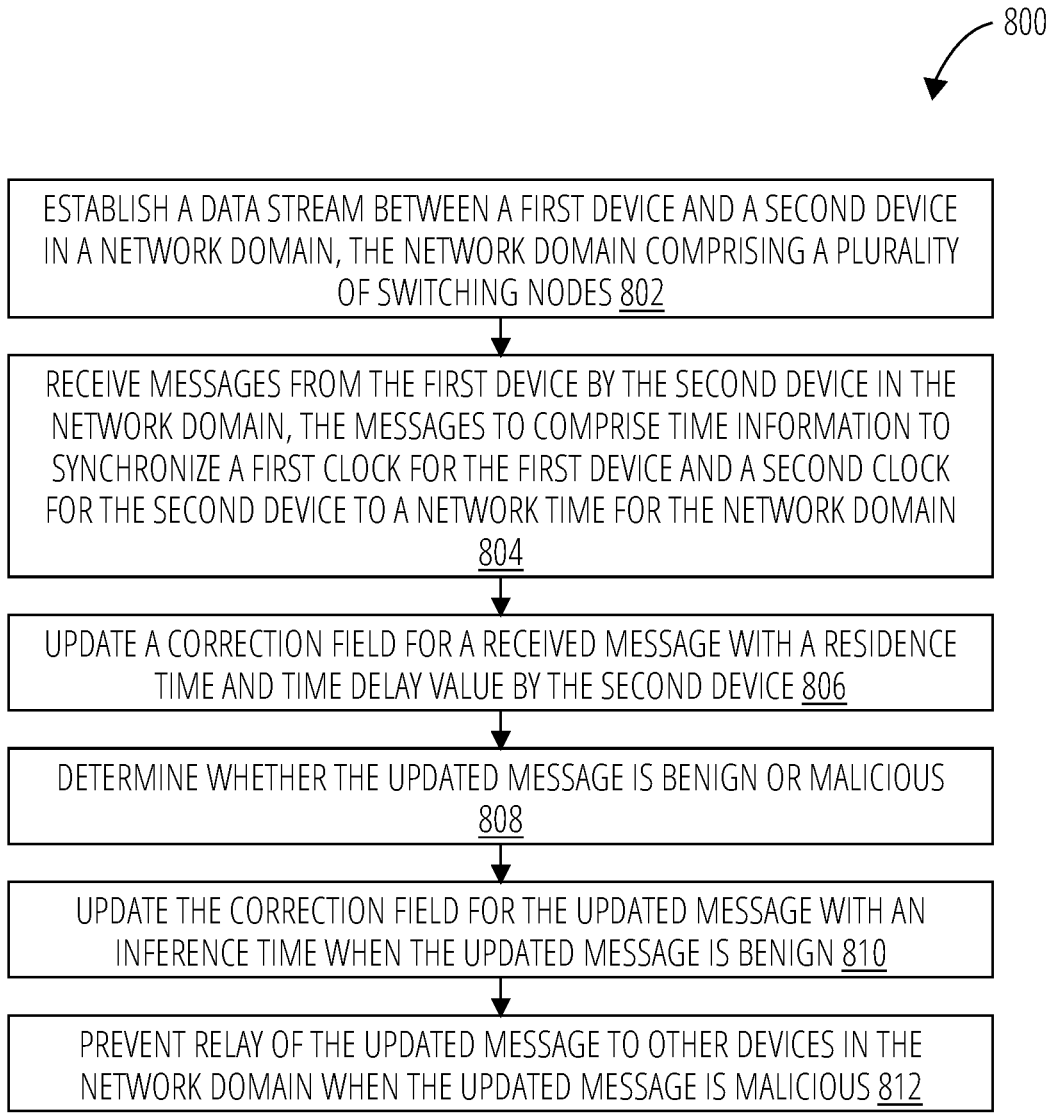
FIG. 8 illustrates a logic flow 800 in accordance with one embodiment.

FIG. 8 illustrates a logic flow 800 that can be implemented by to detect timing attacks, in accordance with non-limiting example(s) of the present disclosure. Logic flow 800 can be implemented by a system providing TSN capabilities, such as systems 400a, 400b, 400c, 500a and/or 500b. The system may comprise a part or subset of a larger network, such as the TSN networks 100a, 100b, 600a, 600b, 600c, 700a and/or 700b. Logic flow 800 can also be implemented by a single device, such as the device 614 of the network 600a, for example. The device 614 is similar to the device 402 as described with reference to FIGS. 4A-4C or the device 508 as described with reference to FIGS. 5A-5B, for example.

In block 802, logic flow 800 establishes a data stream between a first device and a second device in a network domain, the network domain comprising a plurality of switching nodes. For example, assume the device 614 establishes a data stream with the device 606 in the network 600a, which is a TSN-compliant network. The processing circuitry 412 of the device 614 establishes the data stream in accordance with one or more of the IEEE 802.1AS and/or 802.1Qbv and/or 1588 standards. The device 606 operates in a clock leader (CL) role and the device 614 operates in a clock follower (CF) role. The device 606 may comprise a switch or relay node for the network 600a. The device 614 may also comprise a switch or relay node for the network 600a, or it may also comprise a clock follower (CL) node for the network 100a.

In block 804, logic flow 800 receives messages from the first device by the second device in the network domain, the messages to comprise time information to synchronize a first clock for the first device and a second clock for the second device to a network time for the network domain. For example, assume the device 614 receives a message 630 from the device 606 in the network 600a, the message 630 to comprise time information to synchronize a clock for the device 606 and a clock for the device 614 to a network time for the network 600a. The network time may comprise, for example, a precision time protocol (PTP) time. The messages may comprise, for example, synchronization messages, follow up messages, peer delay (pdelay) messages, or delay messages for a PTP. The device 614 can receive the message 630 via a network interface 414 or a radio transceiver using radio frequency (RF) signals.

In block 806, logic flow 800 updates a correction field for a received message with a residence time and time delay value by the second device. For example, assume the device 614 updates a correction field for the received message 630 with a residence time and time delay value. The device 614 generates the residence time with the internal clock and the time delay value with the delay model 514. The device 614 includes a device time update component 510 to update the received message 630 to form updated message 638. The device 614 sends the updated message to an IDS 502 for the device 614.

In block 808, logic flow 800 determines whether the updated message is benign or malicious. For example, assume the IDS 502 for the device 614 inspects messages for malicious characteristics, properties or behavior. The IDS 502 inspects the updated message 638 to determine whether the updated message is benign or malicious, and sends an indicator to the device 614.

In block 810, logic flow 800 updates the correction field for the updated message with an inference time when the updated message is benign. For example, assume the IDS 502 inspects the message 638 and determines the message 638 is benign. The IDS 502 estimates the inference time 506 from an inference model 516 for the IDS 502. The estimated inference time 506 to comprise an estimated time interval between ingress of the updated message to the IDS 502 and egress of the updated message from the IDS 502. The inference model 516 may comprise a neural network, regression model, statistical model or machine-learning model. The device 614 can send the message 638 via a network interface 414 or a radio transceiver using radio frequency (RF) signals.

In block 812, logic flow 800 prevents relay of the updated message to other devices in the network domain when the updated message is malicious. For example, assume the IDS 502 inspects the message 638 and determines the message 638 is malicious. The IDS 502 notifies the device 614, and the device 614 prevents relay of the updated message 638 to other devices in the network 600a, such as the device 622, CF 624 and CF 626. The device 614 prevents relay of the updated message 638 to other devices in the network 600a when the updated message 638 is malicious by dropping the updated message 638 from a relay or egress queue for the device 614.

In addition to dropping the message 638, the device 614 can take other security measures as well. For example, the device 614 can send a notification message to other devices in the network 600a that the updated message 638 from the device 606 is malicious. The device 614 can send a notification message to the other devices in the network 600a indicating that the device 606 is under a security attack and the device 606 should be placed in isolation 636 from the rest of network 600a. The device 614 can send a notification message to the other devices in the network 600a indicating that the device 606 is under a security attack and the other devices should update routing tables with new paths that do not include the device 606. The device 614 can send a notification message to a security monitor to assist in determination of whether the device 606 is an origin of the malicious message 638. The device 614 can send the notification messages via a network interface 414 or a radio transceiver using radio frequency (RF) signals.

The device 614 can also take action to recover timing synchronization for the network 600a. For example, the device 614 can determine that it must recover a network time for its internal clock without using any new messages from the device 606. The device 614 can determine to recover the network time for its internal clock from another device in the network 600a, such as the device 602 which is the CL for the device 614 and the grand CL for the entire network 600a. The device 614 can also recover the network time for its internal clock from other devices in the network 600a, such as the device 604 which is converted from a CF role to a CL role for the device 614. The device 614 can still further recover the network time for its internal clock outside of the network 600a, such as by using global positioning satellite (GPS) circuitry for the device 614, the GPS circuitry to receive timing information for the device 614.

Figure 9:
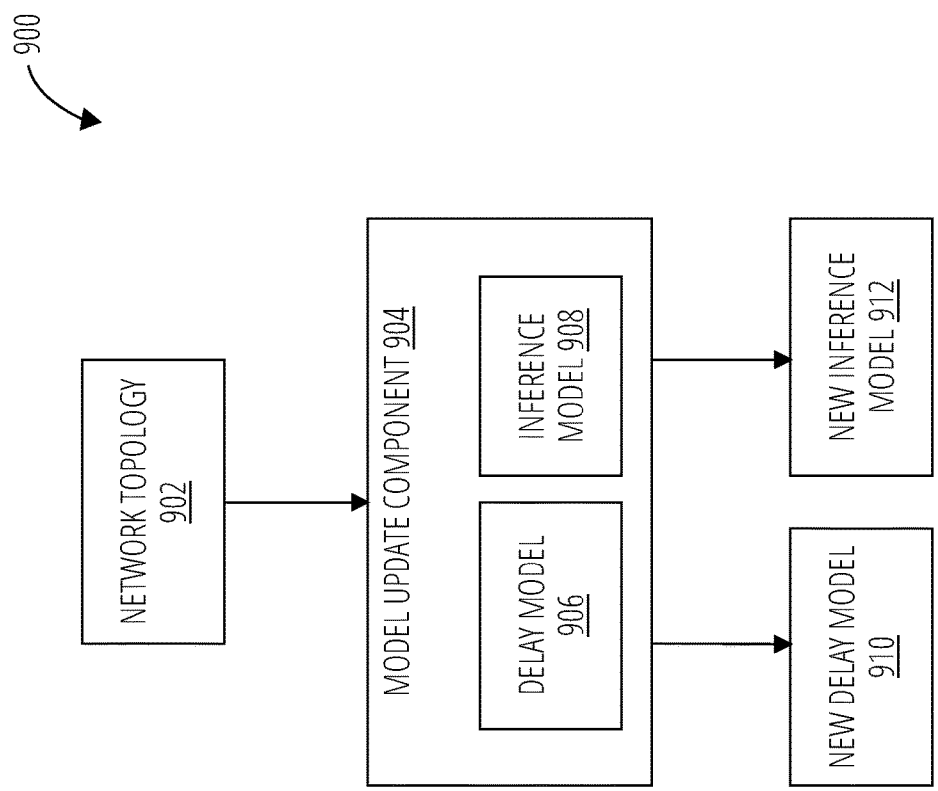
FIG. 9 illustrates an apparatus 900.

FIG. 9 illustrates an apparatus 900 suitable for use with any IDS discussed herein. The apparatus 900 illustrates a model update component 904 having a delay model 906 and an inference model 908. The delay model 906 is similar to the delay model 514, while the inference model 908 is similar to the inference model 516. Once the device 614 detects a desynchronization attack and the compromised device 606, the device 614 can trigger a network reconfiguration protocol to reconfigure a new network topology 902 for the network 600a to isolate and avoid the compromised device 606. The new network topology 902 can cause changes to the way the inference model 516 estimates an inference time 506 for the IDS 502 of the device 614. This is also true for other IDS for other devices in the network 100a. In addition, the new network topology 902 can cause changes to the way the delay model 514 estimates a delay time 512 for the device 614, or other devices in the network 100a. This may be due, for example, to new devices or device types brought online for the new network topology 902, such as replacement devices for the device 606 or other compromised devices in the network 600a.

The apparatus 900 can be used to update old inference models (pre-attack) to new inference models (post-attack). The apparatus 900 can also be used to update old delay models (pre-attack) to new delay models (post-attack). The model update component 904 receives a new network topology 902 for the network 600a that represents a new or modified network configuration responsive to the trigger of the network reconfiguration protocol after the desynchronization attack on the device 606. The model update component 904 generates or updates a delay model 906 to reflect the new network topology 902, and outputs a new delay model 910. Similarly, the model update component 904 generates or updates an inference model 908 to reflect the new network topology 902, and outputs a new inference model 912. The new delay model 906 and the new inference model 912 can be distributed to the devices in the network 100a for deployment.

Once distributed, the device 614 receives the new inference model 912, which can be used to estimate future inference times for the IDS 502 used by the device 614. The new inference model 912 reflects changes made to a network topology of devices in the network 600a operating without the device 606 in response to a security attack. In the event the IDS 502 is implemented off-device from the device 614, in a configuration similar to that described with reference to FIG. 4C, the device 614 can send the new inference model 912 for the IDS 502 to another device implementing the IDS 502 on behalf of the device 614 in the network 600a, wherein the new inference model 912 is used to determine a new inference time by the IDS 502 of the other device in the network 600a.

Figure 10:
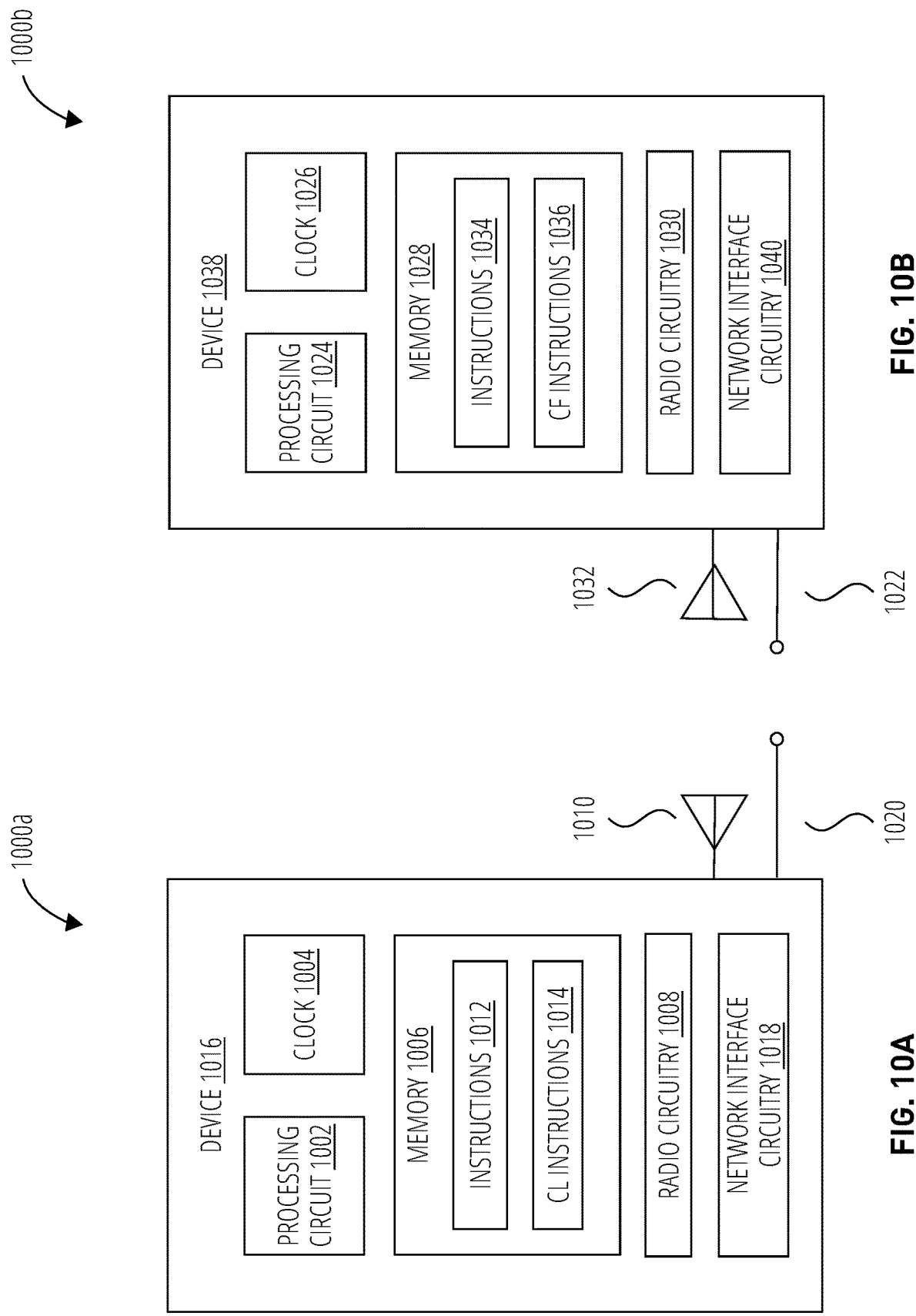

FIG. 10A depicts a device 1016. The device 1016 could be one of the switches in a TSN network (e.g., devices 102, 104A-C, 106, 402, 404, 406, 410, 512, 602, 606, 614, etc.). Device 1016 includes a processing circuit 1002, a clock 1004, memory 1006, radio circuitry 1008, an antenna 1010, a network interface circuitry 1018, and a wired connection 1020. Memory 1006 stores instructions 1012 and CL instructions 1014. During operation, processing circuit 1002 can execute instructions 1012 and/or CL instructions 1014 to cause device 1016 to send timing messages as a clock leader or grand clock leader (e.g., from time measurements from a global clock for a TSN network) to other devices in the TSN network. In some examples, processing circuit 1002 can execute instructions 1012 and/or CL instructions 1014 to cause device 1016 to send time synchronization messages, time update messages, and other timing messages defined by various IEEE standards as discussed herein. Furthermore, processing circuit 1002 can execute instructions 1012 to cause device 1016 to send, via radio circuitry 1008 and antenna 1010 or network interface circuitry 1018 timing messages as the CL for a CF in a TSN network.

FIG. 10B depicts a device 1038. The device 1038 could be one of the switches in a TSN network (e.g., devices 102, 104A-C, 106, 402, 404, 406, 410, 508, 602, 606, 614, etc.). Device 1038 includes a processing circuit 1024, a clock 1026, memory 1028, radio circuitry 1030, an antenna 1032, a network interface circuitry 1040, and a wired connection 1022. Memory 1028 stores instructions 1034 and CF instructions 1036. During operation, processing circuit 1024 can execute instructions 1034 and/or CF instructions 1036 to cause device 1038 to receive timing messages as a clock follower (e.g., from time measurements from a global clock for a TSN network) from other devices in the TSN network, such as the device 1016. In some examples, processing circuit 1024 can execute instructions 1034 and/or CF instructions 1036 to cause device 1038 to receive time synchronization messages, time update messages, and other timing messages defined by various IEEE standards as discussed herein. Furthermore, processing circuit 1024 can execute instructions 1034 and/or CF instructions 1036 to cause device 1038 to receive, via radio circuitry 1030 and antenna 1032 or network interface circuitry 1040 timing messages as the CF for a CL in a TSN network. In addition, processing circuit 1024 can execute instructions 1034 and/or CF instructions 1036 to cause device 1038 to send, via radio circuitry 1030 and antenna 1032 or network interface circuitry 1040 security messages in response to a security attack, such as alert messages, notification messages, network reconfiguration messages, device isolation messages, model update messages, and other messages in a TSN network.

Figure 11:
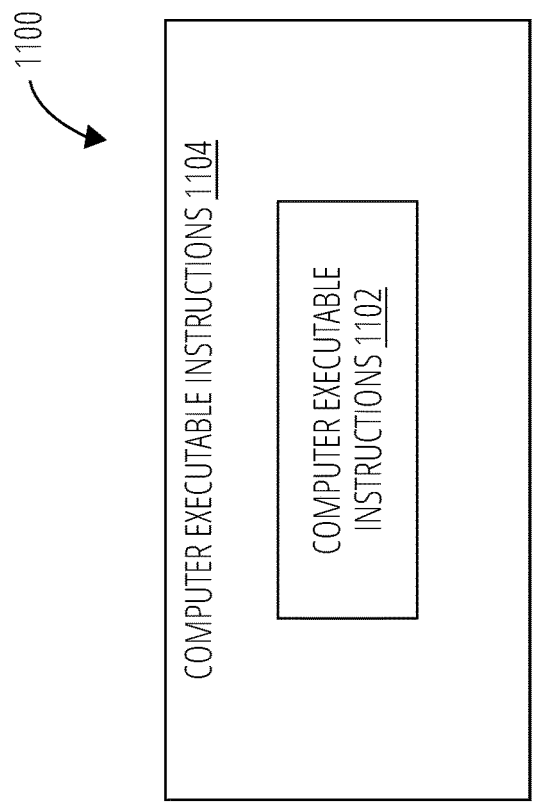
FIG. 11 illustrates a computer-readable storage medium 1100.

FIG. 11 illustrates computer-readable storage medium 1100. Computer-readable storage medium 1100 may comprise any non-transitory computer-readable storage medium or machine-readable storage medium, such as an optical, magnetic or semiconductor storage medium. In various embodiments, computer-readable storage medium 1100 may comprise an article of manufacture. In some embodiments, computer-readable storage medium 1100 may store computer executable instructions 1102 with which circuitry (e.g., processing circuitry 412, processing circuit 1002, processing circuit 1024, radio circuitry 1008, radio circuitry 1030, network interface circuitry 1018, network interface circuitry 1040, or the like) can execute. For example, computer executable instructions 1102 can include instructions to implement operations described with respect to logic flow 800. Examples of computer-readable storage medium 1100 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1102 may include any suitable type of code, such as source code, compiled code, interpreted code, executable code, static code, dynamic code, object-oriented code, visual code, and the like.

Although techniques using, and apparatuses for implementing, an IDS in a TSN have been described in language specific to features or methods, it is to be understood that the subject of the appended claims is not necessarily limited to the specific features or methods described. Rather, the specific features and methods are disclosed as example ways in which an IDS and a TSN can be implemented.

The following examples pertain to further embodiments, from which numerous permutations and configurations will be apparent.

Example 1. An apparatus, comprising: a processing circuitry; a memory coupled to the processing circuitry, the memory to store instructions that when executed by the processing circuitry causes the processing circuitry to: establish a data stream between a first device and a second device in a network domain, the data stream comprising a plurality of switching nodes; receive messages from the first device by the second device in the network domain, the messages to comprise time information to synchronize a first clock for the first device and a second clock for the second device to a network time for the network domain; update a correction field for a received message with a residence time and time delay value by the second device; determine whether the updated message is benign or malicious; update the correction field for the updated message with an inference time when the updated message is benign; and prevent relay of the updated message to other devices in the network domain when the updated message is malicious.

Example 2. The apparatus of example 1, the processing circuitry to establish the data stream in accordance with the Institute of Electrical and Electronics Engineers (IEEE) 802.1AS and/or 802.1Qbv and/or 1588 standards.

Example 3. The apparatus of example 1, wherein the network time comprises a precision time protocol (PTP) time.

Example 4. The apparatus of example 1, wherein the messages are synchronization messages, follow up messages, peer delay (pdelay) messages, or delay messages for a precision time protocol (PTP).

Example 5. The apparatus of example 1, wherein the first device is a relay node in a time sensitive network (TSN).

Example 6. The apparatus of example 1, wherein the first device is a relay node in a time sensitive network (TSN) and the second device is a follower node or another relay node in the TSN.

Example 7. The apparatus of example 1, wherein the first device operates in a clock leader (CL) role and the second device operates in a clock follower (CF) role.

Example 8. The apparatus of example 1, the processing circuitry to update a correction field for the received message with the residence time and the delay value by the second device, and send the updated message to an intrusion detection system (IDS) for the second device.

Example 9. The apparatus of example 1, the processing circuitry to determine whether the updated message is benign or malicious by receiving an indicator from an intrusion detection system (IDS).

Example 10. The apparatus of example 1, the processing circuitry to estimate the inference time from an inference model for an intrusion detection system (IDS), the estimated inference time to comprise an estimated time interval between ingress of the updated message to the IDS and egress of the updated message from the IDS.

Example 11. The apparatus of example 1, the processing circuitry to estimate the inference time from an inference model for an intrusion detection system (IDS), the inference model to comprise a neural network, regression model, statistical model or machine-learning model.

Example 12. The apparatus of example 1, the processing circuitry to prevent relay of the updated message to other devices in the network domain when the updated message is malicious by dropping the updated message from a relay queue.

Example 13. The apparatus of example 1, the processing circuitry to send a notification message to the other devices in the network domain that the updated message from the first device is malicious.

Example 14. The apparatus of example 1, the processing circuitry to send a notification message to the other devices in the network domain indicating that the first device is under a security attack and the first device should be placed in isolation from the network domain.

Example 15. The apparatus of example 1, the processing circuitry to send a notification message to the other devices in the network domain indicating that the first device is under a security attack and the other devices should update routing tables with new paths that do not include the first device.

Example 16. The apparatus of example 1, the processing circuitry to send a notification message to a security monitor to assist in determination of whether the first device is an origin of the malicious message.

Example 17. The apparatus of example 1, the processing circuitry to determine the second clock is to recover the network time for the second device without new messages from the first device.

Example 18. The apparatus of example 1, the processing circuitry to determine the second clock is to recover the network time for the second device from a third device.

Example 19. The apparatus of example 1, the processing circuitry to determine the second clock is to recover the network time for the second device from a third device, wherein the third device operates in a clock leader (CL) role for the first device.

Example 20. The apparatus of example 1, the processing circuitry to receive un updated inference model to estimate future inference times for the intrusion detection system (IDS) by the second device, the updated inference model to reflect changes to a network topology of devices in the network domain without the first device in response to a security attack.

Example 21. The apparatus of example 1, the processing circuitry to send an update to an inference model for an intrusion detection system (IDS) from the second device to a third device in the network domain, wherein the updated inference model is used to determine a new inference time for an IDS of the third device in the network domain.

Example 22. The apparatus of example 1, comprising a network interface coupled to the processing circuitry, the network interface to send and receive messages for the second device.

Example 23. The apparatus of example 1, comprising a radio transceiver coupled to the processing circuitry, the radio transceiver to send and receive messages for the second device using radio frequency (RF) signals.

Example 24. The apparatus of example 1, comprising a global positioning satellite (GPS) circuitry coupled to the processing circuitry, the GPS circuitry to receive timing information for the second device.

Example 25. A computing-implemented method, comprising: establishing a data stream between a first device and a second device in a network domain, the data stream comprising a plurality of switching nodes; receiving messages from the first device by the second device in the network domain, the messages to comprise time information to synchronize a first clock for the first device and a second clock for the second device to a network time for the network domain; updating a correction field for a received message with a residence time and time delay value by the second device; determining whether the updated message is benign or malicious; updating the correction field for the updated message with an inference time when the updated message is benign; and preventing relay of the updated message to other devices in the network domain when the updated message is malicious.

Example 26. The computing-implemented method of example 25, comprising establishing the data stream in accordance with the Institute of Electrical and Electronics Engineers (IEEE) 802.1AS and/or 802.1Qbv and/or 1588 standards.

Example 27. The computing-implemented method of example 25, wherein the network time comprises a precision time protocol (PTP) time.

Example 28. The computing-implemented method of example 25, wherein the messages are synchronization messages, follow up messages, peer delay (pdelay) messages, or delay messages for a precision time protocol (PTP).

Example 29. The computing-implemented method of example 25, wherein the first device is a relay node in a time sensitive network (TSN).

Example 30. The computing-implemented method of example 25, wherein the first device is a relay node in a time sensitive network (TSN) and the second device is a follower node or another relay node in the TSN.

Example 31. The computing-implemented method of example 25, wherein the first device operates in a clock leader (CL) role and the second device operates in a clock follower (CF) role.

Example 32. The computing-implemented method of example 25, comprising updating a correction field for the received message with the residence time and the delay value by the second device, and sending the updated message to an intrusion detection system (IDS) for the second device.

Example 33. The computing-implemented method of example 25, comprising determining whether the updated message is benign or malicious by receiving an indicator from an intrusion detection system (IDS).

Example 34. The computing-implemented method of example 25, comprising estimating the inference time from an inference model for an intrusion detection system (IDS), the estimated inference time to comprise an estimated time interval between ingress of the updated message to the IDS and egress of the updated message from the IDS.

Example 35. The computing-implemented method of example 25, comprising estimating the inference time from an inference model for an intrusion detection system (IDS), the inference model to comprise a neural network, regression model, statistical model or machine-learning model.

Example 36. The computing-implemented method of example 25, comprising preventing relay of the updated message to other devices in the network domain when the updated message is malicious by dropping the updated message from a relay queue.

Example 37. The computing-implemented method of example 25, comprising sending a notification message to the other devices in the network domain that the updated message from the first device is malicious.

Example 38. The computing-implemented method of example 25, comprising sending a notification message to the other devices in the network domain indicating that the first device is under a security attack and the first device should be placed in isolation from the network domain.

Example 39. The computing-implemented method of example 25, comprising sending a notification message to the other devices in the network domain indicating that the first device is under a security attack and the other devices should update routing tables with new paths that do not include the first device.

Example 40. The computing-implemented method of example 25, comprising sending a notification message to a security monitor to assist in determination of whether the first device is an origin of the malicious message.

Example 41. The computing-implemented method of example 25, comprising determining the second clock is to recover the network time for the second device without new messages from the first device.

Example 42. The computing-implemented method of example 25, comprising determining the second clock is to recover the network time for the second device from a third device.

Example 43. The computing-implemented method of example 25, comprising determining the second clock is to recover the network time for the second device from a third device, wherein the third device operates in a clock leader (CL) role for the first device.

Example 44. The computing-implemented method of example 25, comprising receiving un updated inference model to estimate future inference times for the intrusion detection system (IDS) by the second device, the updated inference model to reflect changes to a network topology of devices in the network domain without the first device in response to a security attack.

Example 45. The computing-implemented method of example 25, comprising sending an update to an inference model for an intrusion detection system (IDS) from the second device to a third device in the network domain, wherein the updated inference model is used to determine a new inference time for an IDS of the third device in the network domain.

Example 46. A non-transitory computer-readable storage device, storing instructions that when executed by processing circuitry of a controller of a time sensitive network (TSN), cause the controller to: establish a data stream between a first device and a second device in a network domain, the data stream comprising a plurality of switching nodes; receive messages from the first device by the second device in the network domain, the messages to comprise time information to synchronize a first clock for the first device and a second clock for the second device to a network time for the network domain; update a correction field for a received message with a residence time and time delay value by the second device; determine whether the updated message is benign or malicious; update the correction field for the updated message with an inference time when the updated message is benign; and prevent relay of the updated message to other devices in the network domain when the updated message is malicious.

Example 47. The computer-readable storage medium of example 46, the instructions, when executed by the processing circuitry, cause the controller to establish the data stream in accordance with the Institute of Electrical and Electronics Engineers (IEEE) 802.1AS and/or 802.1Qbv and/or 1588 standards.

Example 48. The computer-readable storage medium of example 46, wherein the network time comprises a precision time protocol (PTP) time.

Example 49. The computer-readable storage medium of example 46, wherein the messages are synchronization messages, follow up messages, peer delay (pdelay) messages, or delay messages for a precision time protocol (PTP).

Example 50. The computer-readable storage medium of example 46, wherein the first device is a relay node in a time sensitive network (TSN).

Example 51. The computer-readable storage medium of example 46, wherein the first device is a relay node in a time sensitive network (TSN) and the second device is a follower node or another relay node in the TSN.

Example 52. The computer-readable storage medium of example 46, wherein the first device operates in a clock leader (CL) role and the second device operates in a clock follower (CF) role.

Example 53. The computer-readable storage medium of example 46, the instructions, when executed by the processing circuitry, cause the controller to update a correction field for the received message with the residence time and the delay value by the second device, and send the updated message to an intrusion detection system (IDS) for the second device.

Example 54. The computer-readable storage medium of example 46, the instructions, when executed by the processing circuitry, cause the controller to determine whether the updated message is benign or malicious by receiving an indicator from an intrusion detection system (IDS).

Example 55. The computer-readable storage medium of example 46, the instructions, when executed by the processing circuitry, cause the controller to estimate the inference time from an inference model for an intrusion detection system (IDS), the estimated inference time to comprise an estimated time interval between ingress of the updated message to the IDS and egress of the updated message from the IDS.

Example 56. The computer-readable storage medium of example 46, the instructions, when executed by the processing circuitry, cause the controller to estimate the inference time from an inference model for an intrusion detection system (IDS), the inference model to comprise a neural network, regression model, statistical model or machine-learning model.

Example 57. The computer-readable storage medium of example 46, the instructions, when executed by the processing circuitry, cause the controller to prevent relay of the updated message to other devices in the network domain when the updated message is malicious by dropping the updated message from a relay queue.

Example 58. The computer-readable storage medium of example 46, the instructions, when executed by the processing circuitry, cause the controller to send a notification message to the other devices in the network domain that the updated message from the first device is malicious.

Example 59. The computer-readable storage medium of example 46, the instructions, when executed by the processing circuitry, cause the controller to send a notification message to the other devices in the network domain indicating that the first device is under a security attack and the first device should be placed in isolation from the network domain.

Example 60. The computer-readable storage medium of example 46, the instructions, when executed by the processing circuitry, cause the controller to send a notification message to the other devices in the network domain indicating that the first device is under a security attack and the other devices should update routing tables with new paths that do not include the first device.

Example 61. The computer-readable storage medium of example 46, the instructions, when executed by the processing circuitry, cause the controller to send a notification message to a security monitor to assist in determination of whether the first device is an origin of the malicious message.

Example 62. The computer-readable storage medium of example 46, the instructions, when executed by the processing circuitry, cause the controller to determine the second clock is to recover the network time for the second device without new messages from the first device.

Example 63. The computer-readable storage medium of example 46, the instructions, when executed by the processing circuitry, cause the controller to determine the second clock is to recover the network time for the second device from a third device.

Example 64. The computer-readable storage medium of example 46, the instructions, when executed by the processing circuitry, cause the controller to determine the second clock is to recover the network time for the second device from a third device, wherein the third device operates in a clock leader (CL) role for the first device.

Example 65. The computer-readable storage medium of example 46, the instructions, when executed by the processing circuitry, cause the controller to receive un updated inference model to estimate future inference times for the intrusion detection system (IDS) by the second device, the updated inference model to reflect changes to a network topology of devices in the network domain without the first device in response to a security attack.

Example 66. The computer-readable storage medium of example 46, the instructions, when executed by the processing circuitry, cause the controller to send an update to an inference model for an intrusion detection system (IDS) from the second device to a third device in the network domain, wherein the updated inference model is used to determine a new inference time for an IDS of the third device in the network domain.

Example 67. An apparatus to manage timing in a network, comprising: means for establishing a data stream between a first device and a second device in a network domain, the data stream comprising a plurality of switching nodes; means for receiving messages from the first device by the second device in the network domain, the messages to comprise time information to synchronize a first clock for the first device and a second clock for the second device to a network time for the network domain; means for updating a correction field for a received message with a residence time and time delay value by the second device; means for determining whether the updated message is benign or malicious; means for updating the correction field for the updated message with an inference time when the updated message is benign; and means for preventing relay of the updated message to other devices in the network domain when the updated message is malicious.

Example 68. The apparatus of example 68, comprising means for establishing the data stream in accordance with the Institute of Electrical and Electronics Engineers (IEEE) 802.1AS and/or 802.1Qbv and/or 1588 standards.

Example 69. The apparatus of example 68, wherein the network time comprises a precision time protocol (PTP) time.

Example 70. The apparatus of example 68, wherein the messages are synchronization messages, follow up messages, peer delay (pdelay) messages, or delay messages for a precision time protocol (PTP).

Example 71. The apparatus of example 68, wherein the first device is a relay node in a time sensitive network (TSN).

Example 72. The apparatus of example 68, wherein the first device is a relay node in a time sensitive network (TSN) and the second device is a follower node or another relay node in the TSN.

Example 73. The apparatus of example 68, wherein the first device operates in a clock leader (CL) role and the second device operates in a clock follower (CF) role.

Example 74. The apparatus of example 68, comprising means for updating a correction field for the received message with the residence time and the delay value by the second device, and sending the updated message to an intrusion detection system (IDS) for the second device.

Example 75. The apparatus of example 68, comprising means for determining whether the updated message is benign or malicious by receiving an indicator from an intrusion detection system (IDS).

Example 76. The apparatus of example 68, comprising means for comprising estimating the inference time from an inference model for an intrusion detection system (IDS), the estimated inference time to comprise an estimated time interval between ingress of the updated message to the IDS and egress of the updated message from the IDS.

Example 77. The apparatus of example 68, comprising means for estimating the inference time from an inference model for an intrusion detection system (IDS), the inference model to comprise a neural network, regression model, statistical model or machine-learning model.

Example 78. The apparatus of example 68, comprising means for preventing relay of the updated message to other devices in the network domain when the updated message is malicious by dropping the updated message from a relay queue.

Example 79. The apparatus of example 68, comprising means for sending a notification message to the other devices in the network domain that the updated message from the first device is malicious.

Example 80. The apparatus of example 68, comprising means for sending a notification message to the other devices in the network domain indicating that the first device is under a security attack and the first device should be placed in isolation from the network domain.

Example 81. The apparatus of example 68, comprising means for sending a notification message to the other devices in the network domain indicating that the first device is under a security attack and the other devices should update routing tables with new paths that do not include the first device.

Example 82. The apparatus of example 68, comprising means for sending a notification message to a security monitor to assist in determination of whether the first device is an origin of the malicious message.

Example 83. The apparatus of example 68, comprising means for determining the second clock is to recover the network time for the second device without new messages from the first device.

Example 84. The apparatus of example 68, comprising means for determining the second clock is to recover the network time for the second device from a third device.

Example 85. The apparatus of example 68, comprising means for determining the second clock is to recover the network time for the second device from a third device, wherein the third device operates in a clock leader (CL) role for the first device.

Example 86. The apparatus of example 68, comprising means for receiving un updated inference model to estimate future inference times for the intrusion detection system (IDS) by the second device, the updated inference model to reflect changes to a network topology of devices in the network domain without the first device in response to a security attack.

Example 87. The apparatus of example 68, comprising means for sending an update to an inference model for an intrusion detection system (IDS) from the second device to a third device in the network domain, wherein the updated inference model is used to determine a new inference time for an IDS of the third device in the network domain.

What is claimed is:

1. An apparatus, comprising:
   a processing circuitry;
   a memory coupled to the processing circuitry, the memory to store instructions that when executed by the processing circuitry causes the processing circuitry to:
   establish a data stream between a first device and a second device in a network domain, the network domain comprising a plurality of switching nodes;
   receive messages from the first device by the second device in the network domain, the messages to comprise time information to synchronize a first clock for the first device and a second clock for the second device to a network time for the network domain;
   update a correction field for a received message with a residence time and time delay value by the second device;
   determine whether the updated message is benign or malicious;
   update the correction field for the updated message with an inference time when the updated message is benign;
   prevent relay of the updated message to other devices in the network domain when the updated message is malicious; and
   estimate the inference time from an inference model for an intrusion detection system (IDS), the estimated inference time to comprise an estimated time interval between ingress of the updated message to the IDS and egress of the updated message from the IDS.

2. The apparatus of claim 1, the processing circuitry to establish the data stream in accordance with the Institute of Electrical and Electronics Engineers (IEEE) 802.1AS and/or 802.1Qbv and/or 1588 standards.

3. The apparatus of claim 1, wherein the messages are synchronization messages, follow up messages, peer delay (pdelay) messages, or delay messages for a precision time protocol (PTP).

4. The apparatus of claim 1, wherein the first device operates in a clock leader (CL) role and the second device operates in a clock follower (CF) role.

5. The apparatus of claim 1, the processing circuitry to update a correction field for the received message with the residence time and the delay value by the second device, and send the updated message to an intrusion detection system (IDS) for the second device.

6. The apparatus of claim 1, the processing circuitry to determine whether the updated message is benign or malicious by receiving an indicator from an intrusion detection system (IDS).

7. The apparatus of claim 1, the processing circuitry to estimate the inference time from an inference model for an intrusion detection system (IDS), the inference model to comprise a neural network, regression model, statistical model or machine-learning model.

8. The apparatus of claim 1, the processing circuitry to prevent relay of the updated message to other devices in the network domain when the updated message is malicious by dropping the updated message from a relay queue.

9. The apparatus of claim 1, the processing circuitry to send a notification message to the other devices in the network domain that the updated message from the first device is malicious.

10. The apparatus of claim 1, the processing circuitry to receive un updated inference model to estimate future inference times for the intrusion detection system (IDS) by the second device, the updated inference model to reflect changes to a network topology of devices in the network domain without the first device in response to a security attack.

11. The apparatus of claim 1, comprising a network interface coupled to the processing circuitry, the network interface to send and receive messages for the second device.

12. The apparatus of claim 1, comprising a radio transceiver coupled to the processing circuitry, the radio transceiver to send and receive messages for the second device using radio frequency (RF) signals.

13. A computing-implemented method, comprising:
   establishing a data stream between a first device and a second device in a network domain, the data stream comprising a plurality of switching nodes;
   receiving messages from the first device by the second device in the network domain, the messages to comprise time information to synchronize a first clock for the first device and a second clock for the second device to a network time for the network domain;
   updating a correction field for a received message with a residence time and time delay value by the second device;
   determining whether the updated message is benign or malicious;
   updating the correction field for the updated message with an inference time when the updated message is benign;
   preventing relay of the updated message to other devices in the network domain when the updated message is malicious; and
   estimate the inference time from an inference model for an intrusion detection system (IDS), the estimated inference time to comprise an estimated time interval between ingress of the updated message to the IDS and egress of the updated message from the IDS.

14. The computing-implemented method of claim 13, comprising establishing the data stream in accordance with the Institute of Electrical and Electronics Engineers (IEEE) 802.1AS and/or 802.1Qbv and/or 1588 standards.

15. The computing-implemented method of claim 13, wherein the messages are synchronization messages, follow up messages, peer delay (pdelay) messages, or delay messages for a precision time protocol (PTP).

16. The computing-implemented method of claim 13, wherein the first device is a relay node in a time sensitive network (TSN).

17. The computing-implemented method of claim 13, wherein the first device operates in a clock leader (CL) role and the second device operates in a clock follower (CF) role.

18. The computing-implemented method of claim 13, comprising determining whether the updated message is benign or malicious by receiving an indicator from an intrusion detection system (IDS).

19. The computing-implemented method of claim 13, comprising estimating the inference time from an inference model for an intrusion detection system (IDS), the inference model to comprise a neural network, regression model, statistical model or machine-learning model.

20. A non-transitory computer-readable storage device, storing instructions that when executed by processing circuitry of a controller of a time sensitive network (TSN), cause the controller to:
  establish a data stream between a first device and a second device in a network domain, the data stream comprising a plurality of switching nodes;
  receive messages from the first device by the second device in the network domain, the messages to comprise time information to synchronize a first clock for the first device and a second clock for the second device to a network time for the network domain;
  update a correction field for a received message with a residence time and time delay value by the second device; determine whether the updated message is benign or malicious;
  update the correction field for the updated message with an inference time when the updated message is benign; and prevent relay of the updated message to other devices in the network domain when the updated message is malicious; and
  estimate the inference time from an inference model for an intrusion detection system (IDS), the estimated inference time to comprise an estimated time interval between ingress of the updated message to the IDS and egress of the updated message from the IDS.

21. The computer-readable storage medium of claim 20, the instructions, when executed by the processing circuitry, cause the controller to establish the data stream in accordance with the Institute of Electrical and Electronics Engineers (IEEE) 802.1AS and/or 802.1Qbv and/or 1588 standards.

22. The computer-readable storage medium of claim 20, wherein the messages are synchronization messages, follow up messages, peer delay (pdelay) messages, or delay messages for a precision time protocol (PTP).

23. The computer-readable storage medium of claim 20, the instructions, when executed by the processing circuitry, cause the controller to determine whether the updated message is benign or malicious by receiving an indicator from an intrusion detection system (IDS).

24. The computer-readable storage medium of claim 20, the instructions, when executed by the processing circuitry, cause the controller to estimate the inference time from an inference model for an intrusion detection system (IDS), the inference model to comprise a neural network, regression model, statistical model or machine-learning model.

* * * * *